US011461385B2

(12) United States Patent
Crosby et al.

(10) Patent No.: US 11,461,385 B2
(45) Date of Patent: Oct. 4, 2022

(54) EVENT-BASED METHODS AND SYSTEMS FOR MANAGING PHOTOGRAPHIC CONTENT

(71) Applicant: 40 North Labs LLC, Park City, UT (US)

(72) Inventors: Michael Benjamin Crosby, Park City, UT (US); Richard M. McEwen, Heber City, UT (US)

(73) Assignee: 40 North Labs LLC, Park City, UT (US)

( * ) Notice: Subject to any disclaimer, the term of this patent is extended or adjusted under 35 U.S.C. 154(b) by 339 days.

(21) Appl. No.: 16/218,456

(22) Filed: Dec. 12, 2018

(65) Prior Publication Data

US 2019/0220482 A1   Jul. 18, 2019

Related U.S. Application Data

(60) Provisional application No. 62/616,918, filed on Jan. 12, 2018.

(51) Int. Cl.
| | |
|---|---|
| *G06F 16/58* | (2019.01) |
| *G06F 16/54* | (2019.01) |
| *H04W 4/30* | (2018.01) |
| *G06F 16/41* | (2019.01) |
| *H04N 7/18* | (2006.01) |

(Continued)

(52) U.S. Cl.
CPC .......... *G06F 16/5866* (2019.01); *G06F 16/41* (2019.01); *G06F 16/538* (2019.01); *G06F 16/54* (2019.01); *G06F 16/55* (2019.01); *G06Q 50/10* (2013.01); *H04N 7/181* (2013.01); *H04W 4/30* (2018.02)

(58) Field of Classification Search
CPC ...... G06F 16/5866; G06F 16/54; G06F 16/41; G06F 16/538; G06Q 50/10; G06Q 10/10; H04W 4/30; H04N 7/181
See application file for complete search history.

(56) References Cited

U.S. PATENT DOCUMENTS

| | | | |
|---|---|---|---|
| 2002/0087546 A1* | 7/2002 | Slater | G06F 16/48 |
| 2008/0174676 A1* | 7/2008 | Squilla | G06F 16/4393 348/231.6 |

(Continued)

*Primary Examiner* — Charles D Adams
(74) *Attorney, Agent, or Firm* — ALG Intellectual Property, LLC

(57) ABSTRACT

An exemplary onsite photo management server located at an event provides a wireless network to couple the server with a network-enabled camera used by a photographer, as well as with a photo kiosk device and a photo printing device located at the event for use by event attendees during the event. The server automatically retrieves, in real time as the photographer photographs the event, photographic content captured by the network-enabled camera. The server also automatically stores the photographic content in accordance with a predefined organizational structure associated with the event. The server provides the photographic content to the photo kiosk device to allow the event attendees to browse, in accordance with the predefined organizational structure, photos captured at the event by the photographer. The server also, on request from an event attendee, provides the photographic content to the photo printing device for printing. Corresponding methods and systems are also described.

20 Claims, 18 Drawing Sheets

(51) Int. Cl.
*G06F 16/538* (2019.01)
*G06Q 50/10* (2012.01)
*G06F 16/55* (2019.01)

(56) References Cited

U.S. PATENT DOCUMENTS

| | | | |
|---|---|---|---|
| 2013/0165164 A1* | 6/2013 | Rowe | H04N 21/4147 455/466 |
| 2014/0375828 A1* | 12/2014 | Miller | H04N 5/23206 348/207.11 |
| 2015/0346977 A1* | 12/2015 | Dubois | G06T 19/00 715/765 |
| 2018/0077136 A1* | 3/2018 | Gajula | G06F 16/48 |
| 2018/0191827 A1* | 7/2018 | Kistler | H04W 88/02 |

* cited by examiner

Sync Control

| Sync Type | Sync Status | Sync Start | Sync Stop | Sync Options |
|---|---|---|---|---|
| ⟲ Sync Photos Up ⓘ | STOPPED | Start | Stop | Run Once ▼ |
| ⟲ Sync Photos Down ⓘ | STOPPED | Start | Stop | Run Once ▼ ◻ Batch mode ◻ New Entry |
| ⇄ Sync My Favorites ⓘ | STOPPED | Start | Stop | Run Once ▼ ◻ Batch mode ◻ New Entry |
| ✶ Sync Multiple ⓘ | STOPPED | Start | Stop | Add Locally Only ▼ |
| ▶ Sync Folder ⓘ | STOPPED | Start | Stop | Guest Uploads ▼ |
| ⚙ Sync Camera ⓘ | STOPPED | Start | Stop | Set cameras IP in General Settings |
| ? Sync Test ⓘ | FINISHED | Start | Stop | Run Once ▼ |

Stop All Syncing

Sync Messages

| | | | |
|---|---|---|---|
| 9/23/2018 01:29:09 PM | SyncTest | Task SYNC Test complete, remove task id |
| 9/23/2018 01:29:09 PM | Sync All | Checking for continuous mode Operation: test Interval 0 |
| 9/23/2018 01:29:09 PM | SyncTest | Connection and time sync with remote server test PASS |
| 9/23/2018 01:29:09 PM | SyncTest | Times in sync: 6.39594 |
| 9/23/2018 01:29:09 PM | SyncTest | Local UTC Time: Date and time |
| 9/23/2018 01:29:09 PM | SyncTest | Remote UTC Time: Date and time |
| 9/23/2018 01:29:09 PM | SyncTest | Checking connection and time sync with remote server |
| 9/23/2018 01:29:09 PM | SyncTest | Using remote server url: http://api.mysiphotos.com |
| 9/23/2018 01:29:09 PM | SyncTest | Starting Sync Test – Task Id: 32b12ac-add7-4833-bfb6 |

Clear Messages

| | 0.00% |
| | 100.00% |
| | |
| | 0.00% |

| Name | Code | Client Name | Password | Event Dates | Galleries | My Favorites | Logins | Downloads | Uploads | | | |
|---|---|---|---|---|---|---|---|---|---|---|---|---|
| 2019 - October | | | | | | | | | | | | |
| C&D Wedding | ClarkW | Catherine Clark | Clark19 | | 83 | 47 | 106 | 0 | 17 | ✎ | 🗑 | ⬆ |
| 2019 - April | | | | | | | | | | | | |
| Demo Event | SI | Specialty Imaging | Welcome | | 264 | 88 | 764 | 1248 | 44 | ✎ | 🗑 | ⬆ |
| 2018 - November | | | | | | | | | | | | |
| Finance Conf. | fhis | Eugene Ericson | florida2018 | | 0 | 0 | 0 | 0 | 0 | ✎ | 🗑 | ⬆ |
| Retail Conf. | rmis | Adam Anderson | florida2018 | | 0 | 0 | 0 | 0 | 0 | ✎ | 🗑 | ⬆ |
| 2018 - October | | | | | | | | | | | | |
| College Recruiting | Recruit | Jessica Johnson | worldseries18 | | 426 | 0 | 71 | 29 | 0 | ✎ | 🗑 | ⬆ |
| Mineral Conf. | Obsidian | Manny Marcano | energy18 | | 0 | 0 | 21 | 0 | 0 | ✎ | 🗑 | ⬆ |
| Integrator Event | Integrate | Pat Peterson | nashville18 | | 0 | 0 | 0 | 0 | 0 | ✎ | 🗑 | ⬆ |
| Veterans on Course | Veteran | | Golf | | 195 | 369 | 48 | 10 | 0 | ✎ | 🗑 | ⬆ |

EVENT-BASED METHODS AND SYSTEMS FOR MANAGING PHOTOGRAPHIC CONTENT

RELATED APPLICATIONS

The present application claims priority under 35 U.S.C. § 119(e) to U.S. Provisional Patent Application No. 62/616,918, filed on Jan. 12, 2018, and entitled "Event-Based Methods and Systems for Managing Photographic Content," the contents of which are hereby incorporated by reference in their entirety.

BACKGROUND INFORMATION

Professional and amateur photographers alike may often be called upon to capture photographic content (e.g., a plurality of photographic instances such as still photos, videos, etc.) for various types of events. For example, it may be desirable to capture photographic content for diverse types of events including, for instance, a wedding, a funeral, a family or class reunion, a political event (e.g., a campaign fundraiser, a speech, etc.), a professional or amateur sporting event, a live performance (e.g., a concert, a play, etc.), a public education event (e.g., a school dance such as a prom, a year book or last day event), a family's day at an amusement park, an individual's major purchase (e.g., a purchase of a new vehicle), a press release, a trade show, a corporate conference, a community event, a race (e.g., a 5K race, a marathon, etc.), and/or any of various other types of events that people may wish to capture and remember in the future by way of the photographic content.

While many programs and options exist for photographers called upon to capture photographic content for the types of events described above, there remains room for improvement in the tools that photographers use to manage (e.g., upload, organize, store, distribute, share, etc.) photographic content and help others engage with the photographic content. For example, photographers may become easily overwhelmed by the complexity and inconvenience of having to manage photos by manually transferring photographic content from a camera to a computer, managing short-term and long-term storage of the photographic content on a local hard drive and/or on one or more different cloud-based databases, distributing properly converted photographic content (i.e., photographic content that is properly formatted and sized for particular devices to which it is being distributed) to clients in a timely manner, organizing and compartmentalizing photographic content associated with different events or different aspects of particular events, and/or performing various other photo management tasks. When such management tasks are not optimized and streamlined, photographers may be distracted and frustrated by having to spend large amounts of time on such management tasks, rather than on the job that the photographers may ultimately wish to focus on, which is capturing more photographic content from more events. There is also room for improvement in how other people interested in the photographic content (e.g., people who commissioned the photographer to capture the photographic content, people who are represented in the photographic content, etc.) engage with and/or manage the photographic content.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 6A-6C illustrate exemplary user interface views that may be presented to a system administrator prior to or during an event according to principles described herein.

FIGS. 8A-8B illustrate exemplary user interface views that may be presented by a web application that provides access to photographic content captured at an event according to principles described herein.

DETAILED DESCRIPTION

Figure 1:
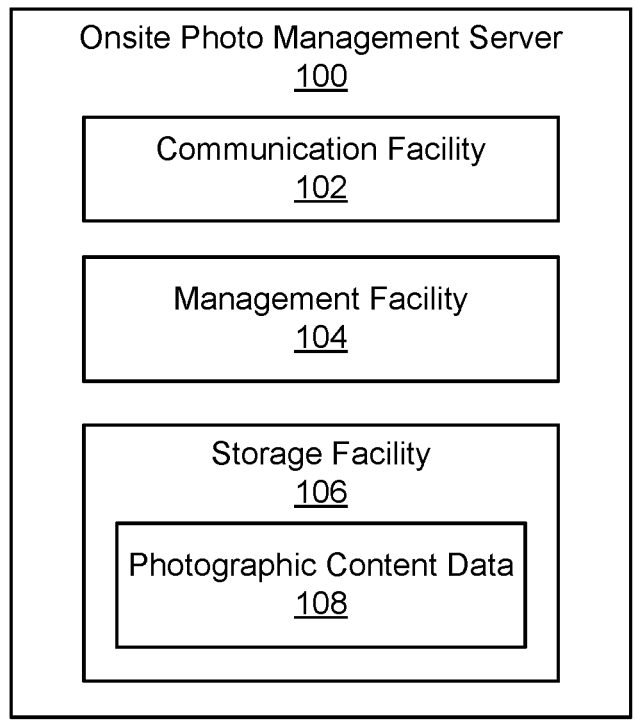
FIG. 1 illustrates an exemplary onsite photo management server for performing event-based methods for managing photographic content according to principles described herein.

Event-based methods and systems for managing photographic content are described herein. For instance, as will be described in more detail below, an exemplary event-based system for managing photographic content may include a network-enabled camera used by a photographer to photograph an event at which the system is located and which is being attended by a plurality of event attendees, a photo kiosk device for use by the plurality of event attendees during the event, a photo printing device for use by the plurality of event attendees during the event, and an onsite photo management server. The system may facilitate management (e.g., uploading, organizing, storing, distributing, browsing, posting to social media, etc.) of photographic content captured by the photographer, as well as, in certain examples, photographic content captured by the event attendees. To this end, the onsite photo management server included within the event-based system may include a wireless communication network interface configured to provide (e.g., for the event at which the onsite photo management server is located) a wireless network by way of which the onsite photo management server is communicatively coupled with the network-enabled camera, the photo kiosk device, and the photo printing device. The onsite photo management server may further include a memory storing instructions and a processor communicatively coupled with the memory and configured to execute the instructions to perform various operations associated with an event-based method for managing photographic content. Specifically, for example, the event-based method may include operations for 1) providing the wireless network, 2) automatically retrieving (e.g., by way of the wireless network) photographic content captured by the network-enabled camera used by the photographer, 3) automatically storing the photographic content (e.g., in response to the automatic retrieval of the photographic content) in accordance with a predefined organizational structure associated with the event, 4) providing the photographic content to the photo kiosk device for display within a user interface presented by the photo kiosk device to allow an event attendee within the plurality of event attendees to browse photos captured at the event by the photographer in accordance with the predefined organizational structure, and 5) providing (e.g., based on a user request indicated by the event attendee) the photographic content to the photo printing device for printing.

In some examples, the onsite photo management server may perform the operations of the event-based method for managing photographic content described above in real time during the event. For example, the automatic retrieving of the photographic content, as well as any of the other operations described above, may be performed in real time as the event is ongoing (e.g., as the photographer is photographing the event using the network-enabled camera).

Additionally, in certain implementations, the onsite photo management server may provide various additional functionality as will be described in more detail below. As one example, along with automatically retrieving, storing, and providing photographic content captured by the network-enabled camera used by the photographer, the onsite photo management server may also automatically retrieve, store, and/or provide (e.g., to the photo kiosk device and/or the photo printing device) attendee-captured photographic content. For example, as will be described in more detail below, event attendees may use their personal mobile devices to capture photographic content at the event and may upload such photographic content to the onsite photo management server in real time either directly (e.g., by way of the wireless network provided by the onsite photo management server) or by way of an offsite photo management server.

As a result of these and other functionality that will be described below, various benefits may arise to the photographer, as well as to event attendees and others interested in the photographic content being captured by the photographer during the event. Specifically, for instance, photographic content captured during the event may be browsed, viewed, shared, distributed (e.g., emailed, messaged, etc.), and printed by event attendees immediately after the photographic content is captured and while the event is still ongoing. Thus, rather than waiting to review the photographic content after the event when the photographer has taken time to upload, organize, and distribute the photographic content (e.g., which may be several days later in certain cases for a busy photographer), event attendees may view, download, and/or print photographic content of interest immediately after the photographic content is captured. In some examples, photographic content captured by event attendees may be uploaded in real time and similarly automatically managed by the onsite photo management server such that this photographic content may similarly be viewed, downloaded, shared, distributed, and/or printed by other event attendees (e.g., or by the photographer) as the event is ongoing and/or after the event is over. Additionally, photographers or administrators may create a predefined organizational structure for the photographic content prior to the event such that photographic content automatically retrieved and managed during the event may be instantly organized and easily browsed during the event (e.g., by the event attendees) with minimal or no additional organizational effort by the photographer during the event as the photographer focuses on capturing high-quality photographic content.

As will be described in more detail below, event-based systems for managing photographic content may also include or be communicatively coupled with an offsite photo management server, such as a centralized database and web server configured to provide short-term and long-term storage of photographic content captured at various events by various clients (e.g., various photographers). The offsite photo management server may facilitate management of the photographic content during the event, as well as after the event has concluded and the onsite photo management server has been taken down and/or repurposed for use at a different event. For example, the offsite photo management server may provide a web server that may be accessed via a web-based application (e.g., via a standard browser) and/or via a mobile application native to mobile devices such as smartphones and tablet devices. The data thus provided by the web server may to allow the photographer and/or event attendees to organize, distribute, download, upload, edit, share (e.g., send via email, text, social network messaging platforms, etc.) and/or otherwise manage the photographic content from the event in a convenient manner during and after the event.

Various benefits may also arise from the use of an offsite photo management server in conjunction with the onsite photo management server. For example, once photographic content (e.g., captured by the network-enabled camera, captured by mobile devices of event attendees, etc.) has been transferred from the onsite photo management server to the offsite photo management server, which may occur in real time during the event, the offsite photo management server may provide a permanent storage facility for the photographic content. Additionally, as will be described in more detail below, certain photographic content, such as photographic content captured by event attendees during the event using their mobile devices, may be uploaded directly from the mobile devices to the offsite photo management server for permanent storage with the photographic content transferred from the onsite photo management server. Once all the photographic content is stored on the offsite photo management server, the photographer, event attendees, and/or others interested in the photographic content (e.g., others who are given access to the content) may browse, download, print, further distribute (e.g., post to social media sites, publish in a photo book, etc.), and/or otherwise manage the photographic content by direct access to the data stored on the offsite photo management server by way of easy-to-use, web-based applications (e.g., mobile applications, browser applications, etc.).

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary onsite photo management server 100 for performing event-based methods for managing photographic content. As will be described and illustrated below, for example, onsite photo management server 100 may be located and used at an event within an event-based system for managing photographic content. As shown, onsite photo management server 100 may include, without limitation, a communication facility 102, a management facility 104, and a storage facility 106 selectively and communicatively coupled with one another. It will be recognized that although distinct and separate facilities 102 through 106 are shown in FIG. 1, these facilities may be representative of any suitable facilities (e.g., including more or fewer facilities than those explicitly shown) that operate to perform the functionality described herein. As such, one or more of facilities 102 through 106 may be omitted from onsite photo management server 100 in certain implementations, while additional facilities may be included within onsite photo management server 100 in the same or other implementations. Each of facilities 102 through 106 will now be described in more detail.

Communication facility 102 may include hardware and/or software (e.g., microprocessors or other types of processing units, custom computer chips or other suitable implementations of computer logic, memories including instructions for causing the hardware to perform operations described herein, etc.) as well as communication interfaces (e.g., network interfaces, etc.) for communicating with devices and/or systems external to onsite photo management server 100 and/or for allowing such devices and systems to communicated with one another. For example, communication facility 102 may include hardware, software, and communication interfaces for providing a wireless network by way of which onsite photo management server 100 is communicatively coupled with a network-enabled camera used by a photographer at an event to photograph the event, and with a photo kiosk device and a photo printing device both located at the event for use by a plurality of event attendees during the event. By way of the wireless network, communication facility 102 may also receive (e.g., retrieve) and/or transmit data that is to be used by, or is generated by, management facility 104 and/or storage facility 106, as will be described below.

Communication facility 102 may also facilitate or enable other types of communication (e.g., wired or wireless communication) with systems and/or devices other than the network-enabled camera, the photo kiosk device, and the photo printing device. For example, communication facility 102 may communicate with an offsite photo management server to synchronize photographic content with (e.g., to and/or from) the offsite photo management server by way of one or more wired or wireless networks (e.g., including an external network distinct from the wireless network such as the Internet, a mobile device carrier network, etc.). As another example, communication facility 102 may communicate with an onsite or offsite administrator device (e.g., an event administration controller) used to configure onsite photo management server 100 and any other devices and/or systems as may serve a particular implementation.

Management facility 104 may include hardware and/or software (e.g., the same or distinct hardware and/or software used by communication facility 102) that is configured to perform various management operations with respect to photographic content as described herein. For example, management facility 104 may be configured to automatically retrieve (e.g., by way of the wireless network provided by communication facility 102) photographic content captured by the network-enabled camera used by the photographer. In some implementations, this automatic retrieving of the photographic content may be performed in real time as the photographer photographs the event using the network-enabled camera. Additionally, management facility 104 may be configured to provide the photographic content to the photo kiosk device for display within a user interface presented by the photo kiosk device. For instance, management facility 104 may provide the photographic content so as to allow an event attendee at the event to browse photos captured at the event by the photographer in accordance with a predefined organizational structure by way of which the photographic content is organized and stored.

Management facility 104 may further perform any of various other operations and features for facilitating photo management at or subsequent to the event as described herein and/or as may serve a particular implementation. For example, management facility 104 may be further configured to provide the photographic content to the photo printing device for printing. The photographic content may be printed, for instance, based on a user request indicated by the event attendee (e.g., as the event attendee is browsing the photographic content using the photo kiosk device).

As another example, management facility 104 may provide a subset of photographic instances (e.g., a subset of photographic included in a plurality of photographic instances making up the photographic content) to a photo book publisher for publishing a photo book including the subset of the photographic instances. These photographic instances may be selected from any photographic content managed by system 100 including, for instance, photographic content captured by the network-enabled camera and/or photographic content captured by event attendees. Such photographic instances may be published in the photo book in response to user input to onsite photo management server 100 from the event attendee. For example, the event attendee may select the subset of the photographic instances during the event using the user interface presented by the photo kiosk device. In some examples, a photo book may be ordered with just one click, such as if a favorites collection is already set up with a user's information (e.g., including shipping address information) and a user wishes to generate a photo book including all the photographic instances included in the favorites collection.

Storage facility 106 may include hardware and/or software (e.g., the same or distinct hardware and/or software used by facilities 102 and/or 104) as well as transitory and/or non-transitory data storage components (e.g., hard drives, memories, etc.) that are configured to perform various storage operations with respect to photographic content as described herein. For example, under direction from facilities 102 and/or 104, storage facility 106 may store photographic content data 108 in accordance with the predefined organizational structure described above that is associated with the event. Photographic content data 108 may include data representative of any suitable photographic content including photographic content captured by the network-enabled camera (e.g., captured by the photographer), photographic content retrieved from (e.g., synchronized with) an offsite photo management server, photographic content captured at the event by mobile devices of event attendees, and/or any other suitable photographic content. As used herein, photographic content may include (e.g., may be made up of) a plurality of photographic instances of various types including, but not limited to, still photos, videos, animated photos (e.g., GIF files, etc.), panoramic photos, three-dimensional images, and/or other images captured using photographic or video technology. As used herein, "photos" may refer to any type of photographic instance as may serve a particular implementation or context.

Storage facility 106 may further include data representative of programming instructions used by onsite photo management server 100 and/or any other data facilitating onsite photo management server 100 in performing the operations described herein as may serve a particular implementation.

In some examples, onsite photo management server 100 may be implemented by a general-purpose computer (e.g., a laptop computer or other portable computer, etc.) that executes software to perform the functionality described herein. In other examples, onsite photo management server 100 may be more specialized to the photographic content management tasks described herein, and may be implemented as a special-purpose computer rather than a general-purpose computer. For instance, in certain embodiments, onsite photo management server 100 may be implemented within a compact and industrial housing (e.g., a housing that is relatively small and portable, relatively rugged and impervious to extreme temperatures, etc.). In these examples, the housing may be specifically configured to house the onsite photo management server and, as such, may not be configured to also house a built-in monitor, keyboard, or other elements typically included in general-purpose portable computers such as laptop computers. An exemplary onsite photo management server of this type will be illustrated below.

Figure 2:
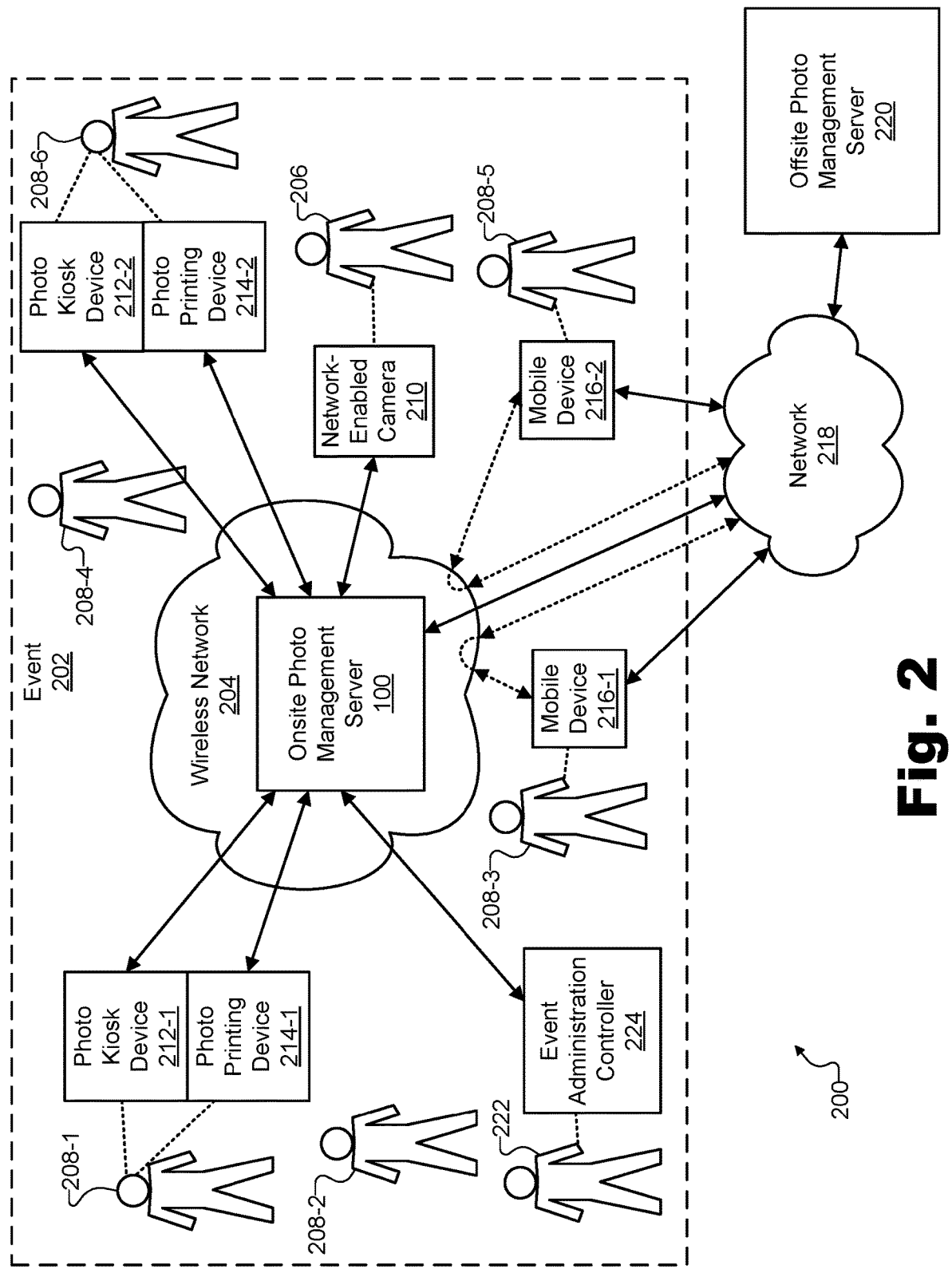
FIG. 2 illustrates an exemplary configuration in which the onsite photo management server of FIG. 1 is employed at an exemplary event to facilitate managing photographic content associated with the event according to principles described herein.

FIG. 2 illustrates an exemplary configuration 200 in which onsite photo management server 100 is employed at an exemplary event 202 to facilitate managing photographic content associated with the event. Specifically, event 202 may be any of the types of events described herein (e.g., a wedding, a political event, a sporting event, etc.) or any other suitable event.

As illustrated in FIG. 2, various system components and people associated with the system components may be located at event 202. For example, as shown, at least one implementation of onsite photo management server 100 may be included at event 202. Onsite photo management server 100 may provide a wireless network 204 by way of which onsite photo management server 100 may communicate with other system components in configuration 200. Additionally, as shown, a photographer 206 and a plurality of event attendees 208 (e.g., attendees 208-1 through 208-6) may be present at event 202. Photographer 208 may be associated with a network-enabled camera 210 (e.g., may be using network-enabled camera 210 to capture photographic content of event 202), while certain attendees 208 may use devices such as a photo kiosk device 212 (e.g., one of photo kiosk devices 212-1 or 212-2), a photo printing device 214 (e.g., one of photo printing devices 214-1 or 214-2), a personal mobile device 216 (e.g., one of mobile devices 216-1 or 216-2) to manage and/or interact with photographic content associated with the event as the event is ongoing.

For example, as shown, attendee 208-1 may interact with photo kiosk device 212-1 and photo printing device 214-1 to browse, print, and/or otherwise manage photographic content captured by photographer 206 (e.g., using network-enabled camera 210) as soon as the photographic content has been captured and automatically retrieved by onsite photo management server 100. Attendee 208-6 may similarly interact with photo kiosk device 212-2 and photo printing device 214-2 (e.g., which may be associated with one another such as by being integrated into a single device or being located at a common location at event 202) to perform similar management of the same or different photographic content. For example, attendee 208-1 may browse and print photographic content in which attendee 208-1 is represented, while attendee 208-6 may browse and print photographic content in which attendee 208-6 is represented.

As shown, attendees 208-3 and 208-5 may each interact with respective mobile devices 216-1 and 216-2 (e.g., implemented by the personal smartphones, tablets, or other such mobile devices used by attendees 208-3 and 208-5) to browse, download, distribute (e.g., post to social media), and/or otherwise manage the photographic content while the event is ongoing. Specifically, as shown, onsite photo management server 100 may be communicatively coupled with mobile devices 216 by way of wireless network 204 while users 208-3 and 208-5 are using mobile device 216.

In some examples, onsite photo management server 100 may provide services to devices 212 through 216 via wireless network 204 without communication with or support from any centralized photo management system. For example, if event 202 is taking place at a location that is relatively remote (e.g., "off the grid") such that the location does not readily offer communicative access to cellular networks, the Internet, or the like (e.g., an event such as a destination wedding at a location on a remote island or mountain top), onsite photo management server 100 may provide the services described herein without any connection to other systems.

In other examples, however, as shown, onsite photo management server 100 may be further connected to a network 218 such as a cellular carrier network (e.g., a mobile device carrier network), the Internet, or the like, so as to be communicatively coupled with an offsite photo management server 220. In these examples, onsite photo management server 100 and offsite photo management server 220 may synchronize photographic content back and forth in real time so that offsite photo management server 220 may provide further services to photographer 206 and attendees 208 during event 202 and after the conclusion of event 202 when onsite photo management server 100 has been taken offline (e.g., to be used at other events).

In particular, in certain examples, mobile devices 216 may be connected to an external network distinct from wireless network 204 (e.g., network 218) that communicatively couples mobile devices 216 with devices or systems external to the event such as with offsite photo management server 220 (e.g., by providing access to the Internet, etc.). In these examples, onsite photo management server 100 may be configured as a web proxy server configured to provide mobile devices 216 access to external network 218. In such examples, mobile devices 216 may be configured to provide attendee-captured photographic content (e.g., photographic content captured by mobile devices 216 during the event) to offsite photo management server 220. As such, onsite photo management server 100 may further be configured to automatically retrieve, from offsite photo management server 220, the attendee-captured photographic content provided by the mobile device, and to automatically store, in response to the automatic retrieving of the attendee-captured photographic content, the attendee-captured photographic content in accordance with the predefined organizational structure associated with the event. The automatic retrieving of the attendee-captured photographic content may be performed in real time as mobile devices 216 provides the attendee-captured photographic content so as to thereby allow onsite photo management server 100 to provide attendee-captured photographic content captured by one attendee 208 immediately to the other attendees 208 in a similar fashion as the photographic content captured by network-enabled camera 210 is provided. Additionally, it will be understood that, in certain examples, mobile devices 216 may provide attendee-captured photographic content more directly to onsite photo management server 100 (e.g., by transmitting the photographic content over wireless network 204) in addition or as an alternative to providing the photographic content to onsite photo management server 100 by way of offsite photo management server 220, as described above.

In these examples in which onsite photo management server 100 is communicatively coupled with offsite photo management server 220 by way of network 218 during event 202, onsite photo management server 100 may be configured to synchronize with offsite photo management server 220 in real time during event 202. Specifically, the synchronization may include providing the photographic content to offsite photo management server 220 by way of network 218, and automatically retrieving additional photographic content from offsite photo management server 220 by way of network 218. In these examples, the synchronization between servers 100 and 220 may be performed in real time as the photographic content is automatically retrieved from network-enabled camera 210 and as the additional photographic content is provided to offsite photo management server 220.

In other examples where mobile devices 216 are not connected to external networks such as network 218 (e.g., because the event is taking place in a remote area where access to such networks is not available), onsite photo management server 100 may also be communicatively coupled with mobile devices 216 by way of the wireless network 204, and onsite photo management server 100 may also be configured to provide the photographic content to mobile devices 216 for display within a user interface presented by mobile devices 216 to allow event attendees 208-3 and 208-5 to browse photos captured at event 202 by photographer 206 in accordance with the predefined organizational structure. However, unlike in the examples described above, in these examples, mobile devices 216 may not be connected, during the event, to any network other than wireless network 204; onsite photo management server 100 may not be connected, during the event, to offsite photo management server 220 by way of external network 218; and the providing of the photographic content to mobile devices 216 may be performed only by way of the wireless network. In these examples, onsite photo management server 100 may synchronize with offsite photo management server 220 subsequent to event 202 when onsite photo management server 100 is connected to offsite photo management server 220 by way of external network 218 (e.g., at a later time when no longer in the remote area).

As further illustrated in FIG. 2, an administrator 222 operating an event administration controller 224 that is also communicatively coupled with onsite photo management server 100 via wireless network 204 may be also be present at event 202. As will be described in more detail below, administrator 222 may use event administration controller 224 to initially configure, maintain, troubleshoot, and/or otherwise manage and operate onsite photo management server 100. For example, event administration controller 224 may be configured to provide a user interface to facilitate administrator 222 in managing onsite photo management server 100, and onsite photo management server 100 may perform any or all of the functionality described herein (e.g., the providing of wireless network 204, the automatic retrieving of the photographic content, the automatic storing of the photographic content, the providing of the photographic content to photo kiosk devices 212 and photo printing devices 214, etc.) in accordance with the managing of onsite photo management server 100 by administrator 222 using the user interface provided by event administration controller 224.

Each of the people and system components illustrated in configuration 200 will now be described in more detail. Throughout this description, additional figures will also be referenced and described as appropriate. It will be understood that while configuration 200 illustrates one particular example of how an event-based system for managing photographic content may be implemented and employed, the principles described with respect to each component below are illustrative only, and various other implementations of event-based systems for managing photographic content (e.g., including different configurations having more devices or fewer devices than illustrated in FIG. 2, different user interfaces than shown in the user interface views below, etc.) may be configured based on the disclosure provided herein.

An implementation of onsite photo management server 100, described above in relation to FIG. 1, may be located onsite at event 202, as shown. As used herein, a photo management server may be located "onsite" at an event when the server is physically located at or near the event so as to be able to communicate directly to other devices being used and located at the event (e.g., network-enabled camera 210 and devices 212, 214, and 216, etc.) over a local area network such as wireless network 204, a wired local area network, or the like.

To this end, onsite photo management server 100 may be a special-purpose computer customized specifically for the onsite event-based operations described herein. For example, in order to be conveniently set up and taken down for an event (e.g., event 202), onsite photo management server 100 may be configured to be portable (e.g., to have a relatively small and convenient form factor to be easy to transport from event to event), to use a relatively low amount of power (e.g., to run on battery power in some examples), and the like. Additionally, onsite photo management server 100 may be configured to meet rugged specifications of heat tolerance (e.g., for outdoor use in warm locations) and/or to have other such industrial characteristics. As for software running on the server, onsite photo management server 100 may be supported by an operating system with a minimal number of background processes running so as to focus on providing the functionality described herein without providing a host of other services unrelated to the photo management server functionality (e.g., as may be provided by a typical desktop or laptop computer). Moreover, due to this simple and focused functionality, onsite photo management server 100 may be relatively easy to set up and administer at the event so that even someone without special computer training may set up and configure onsite photo management server 100 at event 202 (i.e., such that the role of administrator 222 need not necessarily be performed by a computer professional but, rather, may be performed by photographer 206, a host or attendee of event 202, or another person).

As described above in relation to FIG. 1, onsite photo management server 100 may include a wireless communication network interface configured to provide wireless network 204, a memory storing instructions, and a processor communicatively coupled to the memory and configured to execute the instructions to perform various operations of an event-based method for managing photographic content. For example, onsite photo management server 100 may automatically retrieve photographic content captured by the network-enabled camera used by photographer 206 (e.g., in real time as photographer 206 photographs the event using network-enabled camera 210), automatically store the photographic content in accordance with a predefined organizational structure associated with the event (e.g., in response to the automatic retrieval of the photographic content), provide the photographic content to the photo kiosk device to allow event attendees 208 to browse photographic content captured at the event by photographer 206 in accordance with the predefined organizational structure, and provide the photographic content to the photo printing device for printing based on a user request indicated by the event attendee. Additionally, as described above, onsite photo management server 100 may perform additional functionality such as automatically retrieving and storing photographic content captured by attendees 208 (e.g., by way of mobile devices 216), communicating and synchronizing with offsite photo management server 220, and so forth.

Figure 3:
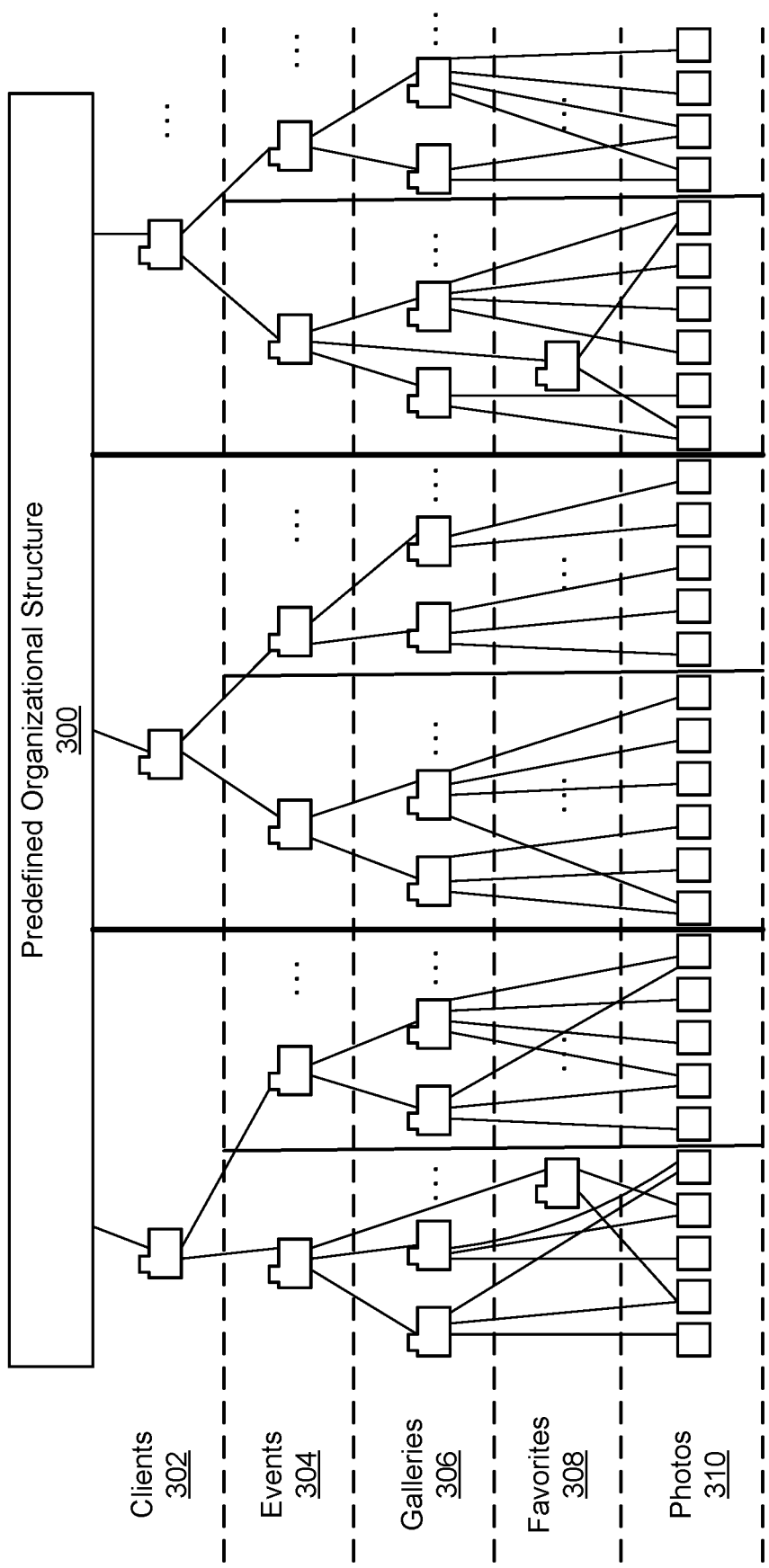
FIG. 3 illustrates an exemplary predefined organizational structure by way of which photographic content captured at events such as the event of FIG. 2 may be managed according to principles described herein.

FIG. 3 illustrates an exemplary predefined organizational structure 300 by way of which photographic content captured at events such as event 202 may be managed (e.g., stored, maintained, browsed, etc.). For example, photographic content captured by photographer 206 using network-enabled camera 210, photographic content captured by attendees 208 using respective mobile devices 216, photographic content synchronized with (e.g., received or downloaded from) offsite photo management server 220, or photographic content from other sources may all be automatically stored in accordance with predefined organizational structure 300. Additionally, photographic content available for browsing, printing, distributing, sharing, texting, viewing, emailing, messaging, downloading, publishing, and so forth by attendees 208 (e.g., by way of photo kiosk devices 212, photo printing devices 214, etc.) may also be organized, browsed, searched, and maintained in accordance with predefined organizational structure 300.

As shown, predefined organizational structure 300 may include various levels of organization. On a highest level, for example, predefined organizational structure 300 may include a plurality of clients 302. For example, one centralized instantiation of software may store photographic content associated with various distinct clients such as different photographers, photography companies, event venues, individuals, and/or other types of clients utilizing event-based hardware and/or software systems and services described herein. In this sense, the centralized software may form the basis of a multi-tenant or multi-client photo management and distribution system designed to allow photo content producers the ability to distribute photos to end users in a variety of ways, including web access, mobile device access, hard copy (e.g., print outs), or via social media.

Under each of clients 302, one or more events 304 may be included on an event layer within predefined organizational structure 300. For example, event 202 may be associated with one of events 304 for a particular client 302. As such, it will be understood that the predefined organizational structure 300 maintained by onsite photo management server 100 may relate to a single event (e.g., event 202) and include all the layers under it, while only the centralized offsite photo management server (e.g., offsite photo management server 220) may maintain the entirety of predefined organizational structure 300 including the client layer and all the events at the event layer.

For each event 304, predefined organizational structure 300 may include a plurality of galleries 306 each associated with particular characteristics that be designated and defined at any time, including by being predefined prior to commencement of the event in anticipation that the particular characteristics will characterize at least a subset of photographic instances (e.g., photos, videos, etc.) included in a plurality of photographic instances making up the photographic content. For example, for an event such as a wedding, distinct galleries 306 for categories such as bridal photos, groom photos, couple photos, family photos, guest photos, cake-cutting photos, and so forth may be designated and associated with the wedding event prior to when the event begins. Each category may be formally or informally associated with certain characteristics (e.g., rules, requirements, etc.) that define the types of photographic instances that will be included in the gallery. For instance, referring to these exemplary wedding galleries to illustrate, "bridal photos" may be characterized by including the bride and no one else, "couple photos" may be characterized by including both the bride and the groom but no one else, "family photos" may be characterized by including family members of the bride or groom (and may or may not also include the bride and/or groom themselves), and so forth.

As such, while a photographer captures photographic content during the event, he or she may be able to conveniently designate each photo or batch of photos as belonging to one or more of the predefined galleries 306 as the photographic content is automatically transmitted to onsite photo management server 100 for storage. While further organization may also be performed after the event concludes, keeping photographic content organized in accordance with predefined galleries (e.g., according to predesignated categories and characteristics) may help keep photographic content organized for convenient browsing, printing, downloading, and so forth by event attendees even as the event is still ongoing (e.g., and as the photographer has not yet had time to go through and process, edit, and organize the photos).

In some examples, certain galleries 306 may be assigned particular characteristics to cause or allow certain photographic content to automatically be associated with the galleries. For example, a particular gallery may be assigned a characteristic that allows photographic content captured by event attendees (rather than the photographer) to be included within the gallery, while another gallery may allow only photographic content captured by the photographer. As another example, galleries may be associated with facial recognition or other object recognition algorithms such that pictures determined to represent certain people or things are automatically included in the galleries.

An organizational layer including a plurality of favorites collections 308 is illustrated below the layer for galleries 306. Favorites collections 308 may each be associated with a different respective person (e.g., a different respective event attendee in the plurality of event attendees) and may be linked to one or more photographic instances designated by the respective event attendee during the event from the plurality of photographic instances making up the available photographic content (e.g., photographic instances captured by the photographer, by other event attendees, etc.). In some examples, the favorites layer may be parallel with the galleries layer. For instance, each of favorites collections 308 may be considered to be a special type of gallery that is associated with a particular person or entity (e.g., with a particular event attendee). To generate a customized favorites collection 308, an event attendee may browse photos associated with various galleries to find photographic content in which the attendee is represented, or that the attendee wishes to download, print, publish in a photo book, or otherwise mark and remember. While, for the sake of clarity in illustration, only a few favorites collections 308 are illustrated in FIG. 3 for a few events 304, it will be understood that there may be a large number of favorites collections 308 (e.g., one for each event attendee and/or for other people having interest in the event) maintained for each event 304. By default, favorites collections 308 may be assigned characteristics that allow photographic content captured by the person associated with the favorites collection 308 to be included in the favorites collection 308.

At the lowest layer of predefined organizational structure 300, a plurality of photographic instances 310 ("photos 310") are shown to represent various instances of photographic content such as still photos, videos, and the like, that have been captured and are being stored in accordance with predefined organizational structure 300. Photos 310 may be captured and provided by, or may otherwise originate from, any suitable source of photographic content described herein. For instance, photos 310 may be attendee-captured photos, photos captured by the network-enabled camera, a combination thereof, or any other suitable photos from any other suitable photographic content source. As shown, each photo 310 may be included within at least one gallery 306. In some examples, a photo may be included in multiple galleries, as shown. However, advantageously, predefined organizational structure 300 does not require that two separate instances of such photos be redundantly stored and maintained, but, rather, only that multiple links from the photo to multiple galleries be designated in the structure. Likewise, multiple photos may be designated to be included within each favorites collection 308 by reference only, rather than by actually copying and maintaining two instances of the same photo file.

Predefined organizational structure 300 may be set up, modified, maintained, and/or otherwise managed at any time with respect to the events represented within it. For example, prior to an event occurring, it may be desirable for an administrator (e.g., a photographer) to set up a plurality of galleries for the types of photographic content expected to be captured. In this way, it may be easy for photographic content to be organized on the fly (e.g., in real time as the event is ongoing), as described above. Additionally or alternatively, predefined organizational structure 300 may be changed during or after the event as additional galleries 306 may be added, as galleries 306 may be combined or deleted, as photos 310 may be designated to be included within certain galleries 306 (e.g., additional galleries 306 other than those selected in real time during the event), as photos 310 may be selected for inclusion in favorites collection 308 of different people browsing the photos at a kiosk during the event or from a mobile device during or after the event, and so forth.

Returning to FIG. 2, wireless network 204 may be implemented as any suitable network (e.g., local area network) that may be employed to allow onsite photo management server 100 to communicate with the various devices and systems shown to be located at event 202 in configuration 200. For example, wireless network 204 may be implemented as a WiFi (e.g., IEEE 802.11-based) network. In other examples, at least certain connections within wireless network 204 may be implemented by wired connections such as Ethernet connections.

In some examples, wireless network 204 may be configured to provide secure connections between onsite photo management server 100 and the different systems and devices connected thereto. For example, such security may be of particular importance for events having high-profile hosts or high-profile attendees and/or where details of what transpires at the event are considered to be sensitive information (e.g., such as certain political events with lots of public officials or high-profile constituents in attendance, etc.). In such examples, various additional security measures above and beyond what might be taken for an ordinary WiFi wireless network may be employed. For example, VLAN separation may be used to isolate photographic content data traffic from other data traffic running over wireless network 204 or other wireless networks at the event. As another example, data traffic may be routed through special hardware or software (e.g., a network assurance stack) to block zero day exploits. In still other examples, periodic vulnerability assessments and/or pen testing of computer systems, networks, and/or applications may be performed to more quickly identify exploitable vulnerabilities, two-factor authentication to these computer systems, networks, and/or applications may be used to reduce a risk of stolen credentials, ongoing vulnerability remediation may be employed to reduce attack surface of software components, or other suitable security measures may be employed as may serve a particular implementation.

As shown, onsite photo management server 100 may be communicatively coupled with various components of an overarching event-based system for managing photographic content by way of wireless network 204. For instance, in one example, an event-based system for managing photographic content may include onsite photo management server 100, at least one network-enabled camera (e.g., such as network-enabled camera 210), at least one photo kiosk device (e.g., such as one of photo kiosk devices 212), and at least one photo printing device (e.g., such as one of photo printing devices 214).

Figure 4:
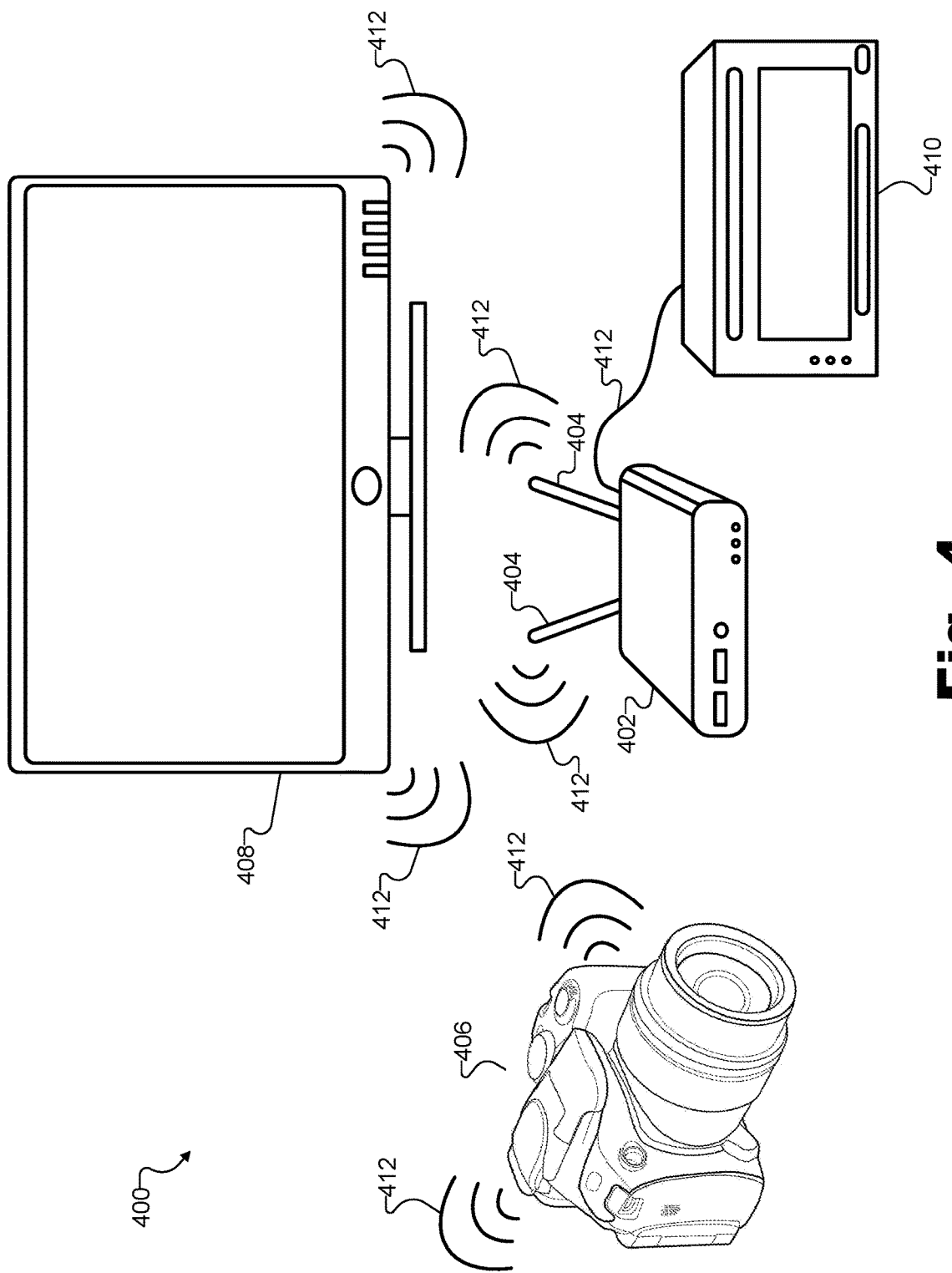
FIG. 4 illustrates an exemplary implementation of an event-based system for managing photographic content according to principles described herein.

To illustrate, FIG. 4 shows an exemplary implementation of an event-based system 400 for managing photographic content. As shown, an onsite photo management server 402 (e.g., corresponding to onsite photo management server 100) may be implemented as a portable, rugged, special-purpose computer with antennas 404 for providing a wireless network such as wireless network 204. As shown, a compact and industrial housing may house onsite photo management server 402 while not housing a built-in monitor, keyboard, or other such elements typically associated with general-purpose computers (e.g., laptop computers, etc.).

Onsite photo management server 402 may be communicatively coupled with a network-enabled camera 406 (e.g., corresponding to network-enabled camera 210) implemented as a professional WiFi camera, a photo kiosk device 408 (e.g., corresponding to photo kiosk device 212) implemented as a touchscreen computer configured to present a user interface to users such as event attendees, and a photo printer device 410 (e.g., corresponding to photo printing device 214) implemented as a portable instant photo printer.

As shown, each of the components of event-based system 400 may be communicatively coupled with one another (or at least with onsite photo management server 402) by way of various connections 412, some of which may be wireless and others of which may be wired. While exemplary wired and wireless connections are shown in FIG. 4 for illustrative purposes, it will be understood that each connection between onsite photo management server 402 and another element may be either wireless or wired, or may be both (e.g., to provide redundancy). In some example, connections 412 may implement wireless network 204.

While particular styles and models of the components of event-based system 400 are illustrated in FIG. 4, it will be understood that various other styles or models of similar components may be employed as may serve a particular implementation. Additionally, more or fewer components of event-based system 400 may be included in certain examples. For instance, in some examples, event-based system 400 may further include an event administration controller such as event administration controller 224 (e.g., implemented as a laptop computer, a mobile device, etc.).

Returning to FIG. 2, along with the specific components illustrated in event-based system 400, onsite photo management server 100 may further be communicatively coupled with various other systems and devices. Such devices may also be included in an event-based system for managing photographic content in some examples, or may be at least temporarily coupled with such a system in order to perform operations described herein. For example, as illustrated in configuration 200, mobile devices 216, network 218, offsite photo management server 220, and event administration controller 224 may be communicatively coupled with onsite photo management server 100 by way of wireless network 204.

Photographer 206 and event attendees 208 may be any suitable people at the event and, in some examples, may be interchangeable. For example, while in some examples, photographer 206 may be a professional photographer specifically commissioned to capture event 202 (e.g., a professional wedding photographer hired to photograph a wedding), in other examples, the role of photographer 206 may be performed by amateur photographers, event attendees 208, or other suitable people. For instance, in certain examples, network-enabled camera 210 may be permanently stationed at a particular location at event 202 and may be configured to automatically snap pictures of people walking by and/or posing for a photo at the particular location (e.g., a photo booth or the like). In such examples, the subjects of the photos may be considered to be photographer 206, since those people caused network-enabled camera 210 to capture the photographic content. In other examples, network-enabled camera 210 may be free to roam around the event so that attendees may capture photographic content of themselves or others and then pass network-enabled camera 210 on to other attendees to similarly capture photographic content as desired. In these examples too, any event attendee using network-enabled camera 210 to capture photographic content may be considered to be photographer 206 for at least the purposes of that photographic content.

In like manner, attendees 208 who use photo kiosk devices 212, photo printing devices 214, and mobile devices 216 may be guests invited to attend event 202, professional photographers (e.g., including photographer 206) in attendance at the event, people hosting the event, or the like.

Network-enabled camera 210 may be implemented by any suitable camera that is configured to communicate over a network (e.g., a WiFi network, another type of wireless network, etc.) so as to transmit photographic content that the camera captures. For example, network-enabled camera 210 may be a WiFi camera that may be accessed by another device or system such as by onsite photo management server 100 via wireless network 204.

Onsite photo management server 100 may automatically retrieve photographic content captured by network-enabled camera 210 in any suitable way. For instance, onsite photo management server 100 may be configured to communicate with network-enabled camera 210 in real time such as by automatically communicating with network-enabled camera 210 every few seconds (e.g., once every second, once every five seconds, once every ten seconds, etc.) to determine if new photographic content has been captured by network-enabled camera 210 that has not previously been retrieved and stored by onsite photo management server 100. To this end, onsite photo management server 100 may include specific code (e.g., computer instructions) configured to cause onsite photo management server to automatically communicate, in real time, with network-enabled camera 210 to download photographic content captured by the camera and to automatically store this photographic content within onsite photo management server 100 in accordance with the predefined organizational structure (e.g., predefined organizational structure 300). This photographic content may then be browsed by way of photo kiosk devices 212, printed by way of photo printing devices 214, and/or automatically uploaded to offsite photo management server 220 (e.g., by way of network 218). Once the photographic content has been uploaded to offsite photo management server 220, the photographic content may also be browsed, downloaded, viewed, etc., by onsite devices at event 202 (e.g., mobile devices 216) and/or offsite devices (e.g., mobile devices, web browsers, etc.) in any of the ways described herein.

Network-enabled camera 210 may be connected to onsite photo management server 100 in any suitable way. For example, as shown in FIG. 2, network-enabled camera 210 may be communicatively coupled with onsite photo management server 100 by way of wireless network 204, such as by using a service set identifier ("SSID") and WiFi Protected Access/Pre-Shared Key ("WPA/PSK") authentication or another suitable authentication. In some examples, network-enabled camera 210 may be configured to use a static Internet Protocol ("IP") address and gateway IP address once connected to wireless network 204. Thus, a background process running on onsite photo management server 100 may discover network-enabled camera 210 by polling at the specific static IP address assigned to network-enabled camera 210. At this point, onsite photo management server 100 may begin communicating with network-enabled camera 210 at the static IP address to negotiate a connection and begin a dialog with the camera using a communication protocol associated with network-enabled camera 210.

The communication protocol associated with network-enabled camera 210 may be any suitable proprietary or standardized protocol implemented by the specific implementation of network-enabled camera 210. In some examples, this protocol may include a command causing the camera to provide a listing or other description of photographic content stored on the camera (e.g., stored on a flash memory card or internal memory within network-enabled camera 210).

Accordingly, onsite photo management server 100 may request and obtain the listing or description of photographic content from network-enabled camera 210 and compare that with a listing of photographic content that has previously been retrieved from network-enabled camera 210. As mentioned above, this process may be performed in real time by periodically requesting and analyzing the listing in this way (e.g., once every few seconds).

Accordingly, onsite photo management server 100 may use this technique to determine whether any new photographic content (i.e., photographic content that has not been previously retrieved) has been captured and stored on network-enabled camera 210 in real time (e.g., every few seconds). When onsite photo management server 100 identifies new photographic content, onsite photo management server 100 may immediately retrieve (e.g., request, download, etc.) the new photographic content and store the photographic content in accordance with the predefined organizational structure maintained within onsite photo management server 100 so that the new photographic content will immediately be browsable, printable, and/or otherwise manageable using devices 212 and/or 214. In other examples, onsite photo management server 100 may bypass the determination of whether any new photographic content is present and may instead send a command to download all the photographic content currently stored by network-enabled camera 210.

Once onsite photo management server 100 has thus automatically retrieved photographic content from network-enabled camera 210, onsite photo management server 100 (e.g., the same or a different background process running on onsite photo management server 100) may update a listing of what photographic content has been previously downloaded (e.g., what photographic content has been retrieved and stored by onsite photo management server 100) that onsite photo management server 100 maintains itself. In this way, onsite photo management server 100 may keep this listing up to date to thereby enable onsite photo management server 100 to continuously and accurately distinguish new photographic content captured by network-enabled camera 210 from other photographic content captured previously. New photographic content retrieved (e.g., downloaded) in this way may then be stored on onsite photo management server 100 in accordance with a predefined organizational structure, as well as transmitted to offsite photo management server 220 for long-term storage in accordance with the same or a similar (e.g., corresponding) predefined organizational structure, as described above.

In some examples, network-enabled camera 210 may be temporarily disconnected from wireless network 204. For instance, photographer 206 may intentionally disconnect the camera from the network or may move the camera out of range of the network such that the disconnection occurs inadvertently. After becoming disconnected, network-enabled camera 210 may continue capturing photographic content, and may be manually or automatically reconnected to wireless network 204 at a later time (e.g., when the camera is brought back into range of wireless network 204). One advantage of the process described above for identifying which photographic content is "new photographic content" (i.e., photographic content not yet retrieved by onsite photo management server 100) is that, when network-enabled camera 210 reconnects to wireless network 204, any photographic content captured while network-enabled camera 210 was offline (e.g., out of range of wireless network 204) may be automatically retrieved along with additional new photographic content captured after the reestablished connection is made. In this way, photographic content is not lost to onsite photo management server 100 even when network-enabled camera 210 is carried out of range, has temporary network connectivity problems, or the like.

The techniques described above for onsite photo management server 100 to automatically retrieve and store photographic content captured by network-enabled camera 210 may provide significant benefits and a significant improvement in convenience, ease-of-use, and functionality when compared with conventional techniques for transferring photos from a camera to a computer. For example, the automatic wireless retrieval of photographic content described herein (e.g., including only new photographic content in certain examples) is much more convenient than a conventional manual process for selecting photos and selecting them for transfer to particular folders. Many conventional techniques require a physical memory card to be removed from a camera and manually connected to a computer (e.g., entered into a card reader) and/or for a camera to be physically coupled with a computer (e.g., via a wired interface such as Universal Serial Bus ("USB")). Even in conventional examples involving network-enabled cameras capable of transferring photographic content wirelessly, software running on a computer typically downloads photographic content that is manually selected by a user and moves it to a specific folder (e.g., a folder associated with downloads from the network-enabled camera rather than, for example, associated with a particular event or gallery). Organizing the photographic content in accordance with a desired organizational structure is then typically performed manually by a user after the fact (e.g., after the event).

In contrast, as described above, onsite photo management server 100 may advantageously retrieve only new photographic content, may do so automatically and in real time, and may then automatically organize the photographic content (e.g., store the photographic content according to the predefined organizational structure). This frees up photographer 206 to continue focusing on capturing more photographic content rather than focusing on moving data around or organizing it, while simultaneously enabling attendees 208 to instantly browse, print, and manage the photographic content as it is presented in accordance with the predefined organizational structure (e.g., using devices 212, 214, and/or 216).

As illustrated by photo kiosk devices 212 and photo printing devices 214, one or more kiosks may be included at event 202 at which event attendees or others may browse, view, and print photographic content. For example, a kiosk at event 202 may include both a photo kiosk device 212 implemented by a convenient and easy-to-use user interface implemented on a touch screen or other type of readily accessible interface mechanism, as well as a photo printing device 214. In some examples, these devices may be separate devices while in other examples, they may be integrated into a single device. When not in use, photo kiosk devices 212 may be programmed to present photographic content in any suitable way, such as by presenting a montage or slideshow of photographic content from the event (e.g., from a particular gallery in the predefined organizational structure). Additionally, certain photo kiosk devices 212 (e.g., implemented as relatively large screens or projectors) may be implemented to show continuous slideshows of photographic content from the event. As such, these types of photo kiosk devices (not explicitly shown in FIG. 2) may not be associated with a corresponding photo printing device 214 or a user interface that accepts user input from event attendees.

Photographic content that may be browsed, viewed, and printed using photo kiosk devices 212 and/or photo printing devices 214 may be any photographic content as may serve a particular implementation. For example, photographic content may include photographic content that has been captured during event 202 by photographer 206 (e.g., using network-enabled camera 210), photographic content that has been captured during event 202 by attendees 208 (e.g., using respective mobile devices 216), or photographic content that has been captured at another time (e.g., previous to event 202) that has been previously stored on onsite photo management server 100 and/or is synchronized to (e.g., transmitted to) onsite photo management server 100 from offsite photo management server 220 during event 202.

To illustrate exemplary functionality of photo kiosk devices 212 and user interfaces that these devices present, FIGS. 5A-5D show exemplary user interface views 500 (e.g., views 500-A through 500-D) that may be presented to event attendees using a photo kiosk device at an event (e.g., one of photo kiosk devices 212).

Figure 5A:
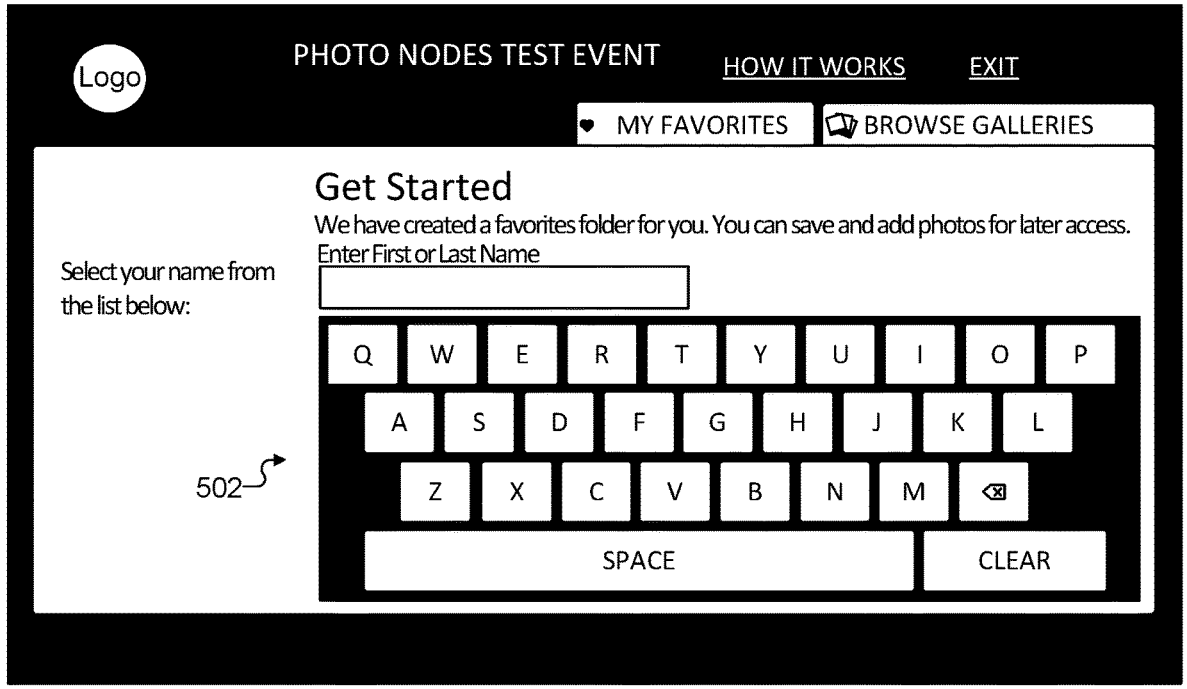
FIGS. 5A-5D illustrate exemplary user interface views that may be presented to event attendees using a photo kiosk device at an event according to principles described herein.

Specially, FIG. 5A illustrates a view 500-A that shows a touchscreen keyboard 502 that may be presented to allow a user (e.g., one of attendees 208) to enter personal information, set up a favorites collection, and/or otherwise begin to interact with the photographic content.

Figure 5B:
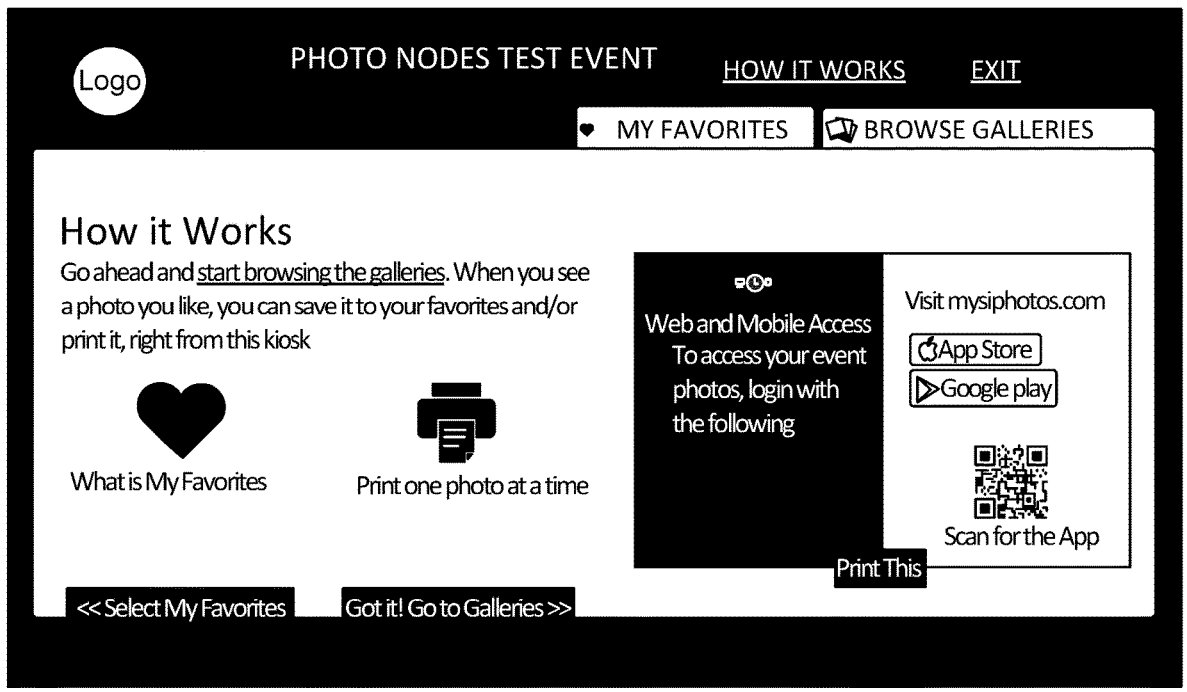

FIG. 5B illustrates a view 500-B that shows an exemplary instruction screen that explains how the photo kiosk device works and integrates with the rest of the event-based system (e.g., including applications accessed by way of a web browser or a mobile application or the like).

Figure 5C:
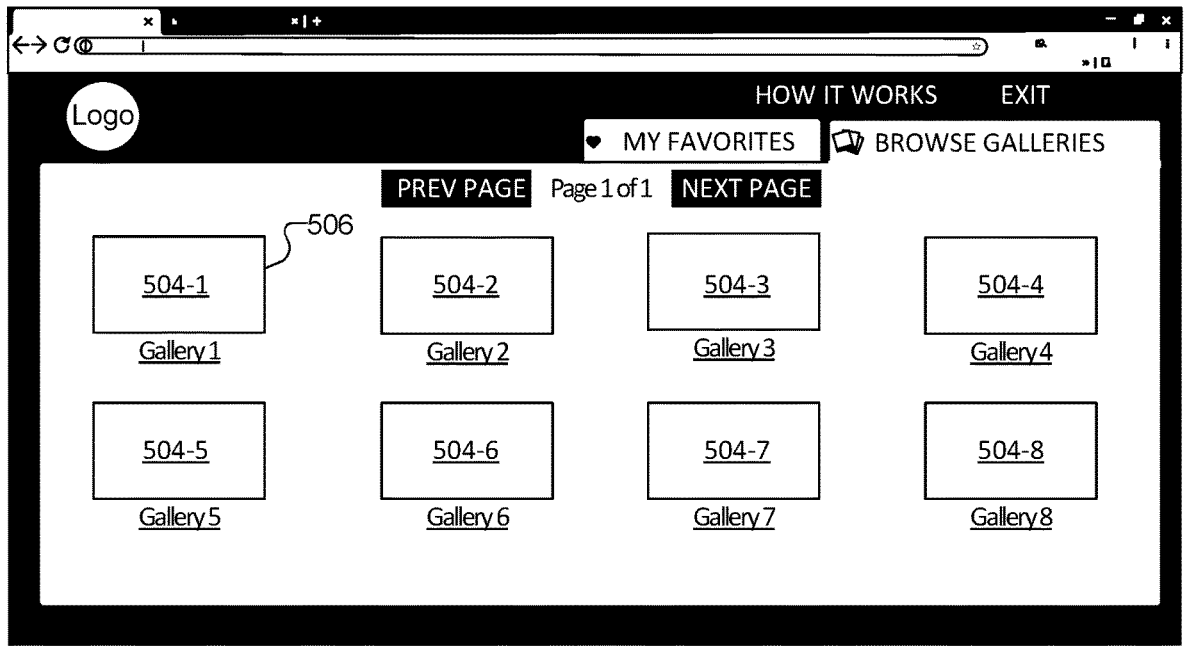

FIG. 5C illustrates a view 500-C that shows exemplary galleries 504 within a predefined organizational structure that the user may browse. For example, various galleries 504 may be browsed using conventional interface actions such as touch screen finger swipes, physical navigation keys, or the like. Each gallery 504 may show an exemplary photo representative of content of the gallery and/or may include text or the like to indicate the characteristics of the photographic content within the gallery. For example, as shown, gallery 504-1 may include a photo 506 that indicates the type of photographic content that is included within gallery 504-1, and that, when selected (e.g., clicked, touched on the touch screen, etc.) may open gallery 504-1 for browsing by the user.

Figure 5D:
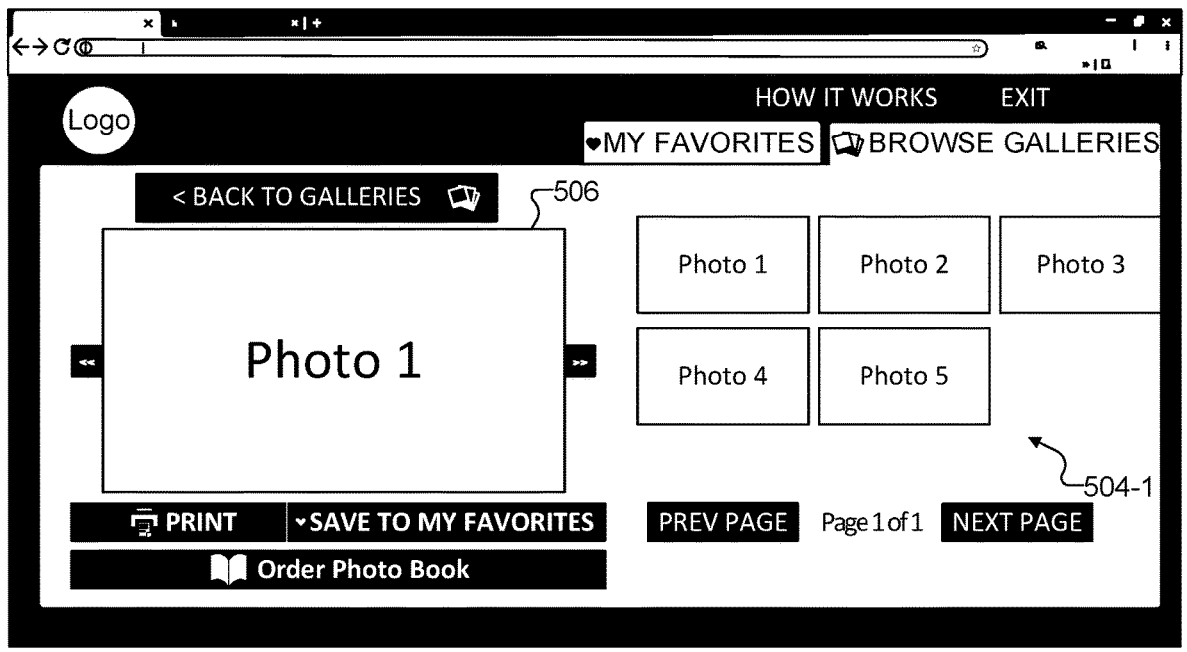

To illustrate, FIG. 5D shows a view 500-D in which photographic content within gallery 504-1 may be browsed. As shown, thumbnails of each photo included within gallery 504-1 (e.g., including photo 506) may be shown in one pane, while a more detailed depiction of a currently selected photo (e.g., photo 506 in this example) is shown in a separate pane. When any photo within the gallery is selected or designated, various options may be made available to the user for managing that photo. Specifically, as shown by various buttons under the selected photo 506 ("Photo 1"), a selected photo may be saved to a "favorites" collection of the user ("SAVE TO MY FAVORITES" button), sent to the photo printing device associated with the photo kiosk device ("PRINT" button), posted to social media (button not shown), or otherwise managed or distributed as may serve a particular implementation.

In certain examples, the user may provide user input to onsite photo management server 100 to indicate that the user wishes to publish the selected photo and/or other photos in the gallery in a photo book (e.g., a physical book that may be published and mailed to the user at a later time). Specifically, in response to user input selecting the "Order Photo Book" button in view 5D, the onsite photo management server may provide a subset of photographic instances included in a plurality of photographic instances making up the photographic content to a photo book publisher for publishing a photo book including the subset of the photographic instances. The subset of the photographic instances may be any suitable subset of photographic instances selected during the event by the event attendee using the user interface presented by the photo kiosk device. For example, the subset may include all of the photos in one particular gallery or in a plurality of selected galleries. In other examples, the subset may include all of the photos in the respective favorites collection of the user or another suitable collection of photos from the event. In some examples, a photo book may advantageously be ordered with minimal effort by the user in terms of formatting and selecting photographic instances for the book. For instance, in some implementations, a photo book may be ordered with one click (i.e., the selection of a single button.)

While certain functionality is illustrated by FIGS. 5A through 5D, it will be understood that photo kiosk devices 212 may browse other galleries and favorites collections not explicitly shown and/or may perform various additional operations not explicitly shown as may serve a particular implementation.

Returning to FIG. 2, administrator 222 may be any suitable person located at event 202 (e.g., photographer 206, one of attendees 208, or a person specifically attending event 202 to oversee the event-based system setup). Additionally or alternatively, administrator 222 may be a remote administrator who sends configuration commands from an offsite location (e.g., somewhere remote from event 202) to onsite photo management server 100 via a network such as network 218. To this end, event administration controller 224 may be any computer system (e.g., a laptop, a tablet computer, etc.) configured to communicate with onsite photo management server 100 to configure, set up, troubleshoot, monitor, and/or otherwise administer onsite photo management server 100 and/or other components of the event-based system. For instance, event administration controller 224 may be used to administer not only onsite photo management server 100, but also photo kiosk devices 212, photo printing devices 214, network-enabled camera 210, and the like. In some examples, event administration controller 224 may communicate with onsite photo management server 100 to create or edit a predefined organizational structure by way of which photographic content is stored (e.g., automatically stored) on onsite photo management server 100. Additionally or alternatively, the predefined organizational structure may be created and/or edited during event 202 using photo kiosk devices such as photo kiosk devices 212.

Figure 6A:
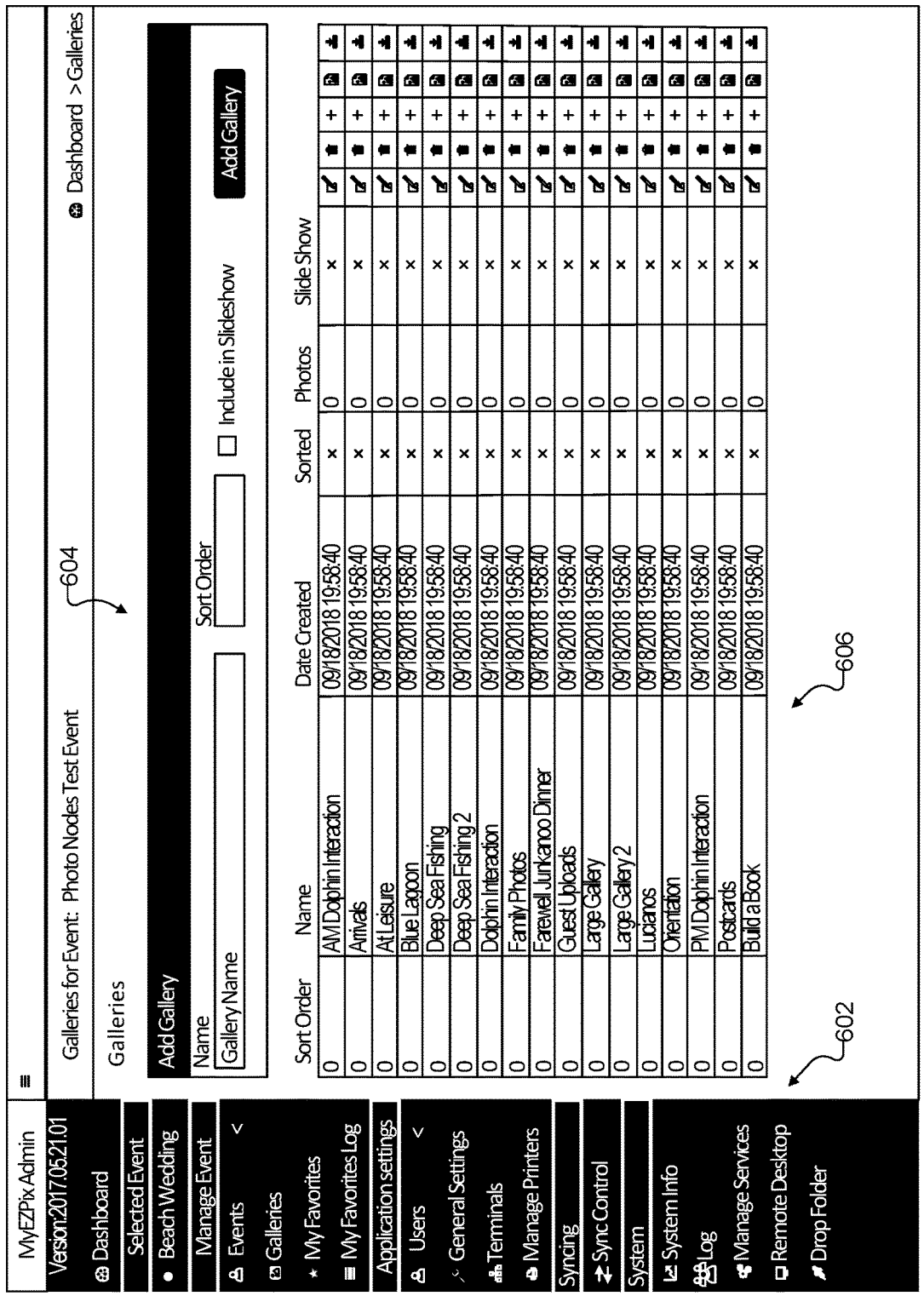
Figure 6B:
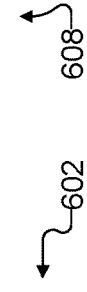

To illustrate exemplary functionality of event administration controller 224 and a user interface that it may present, FIGS. 6A-6C show exemplary user interface views 600 (e.g., views 600-A through 600-C) that may be presented to administrator 222 prior to or during event 202.

For example, in FIG. 6A, view 600-A shows an interface by way of which galleries and/or other aspects of a predefined organizational structure may be configured (e.g., created, deleted, edited, reorganized, etc.). As shown, a sidebar 602 may provide various options to allow administrator 222 to intuitively manage events, settings, synchronization, and so forth. A pane 604 is shown to allow administrator 222 to add a new gallery to the predefined organizational structure, while a listing 606 illustrates each of the galleries that may have already been created, along with various data and options for each gallery.

In FIG. 6B, view 600-B shows an interface by way of which photo printing devices may be configured. Specifically, as shown, sidebar 602 is still included on the side, while options for and various status information about available printers is illustrated in a pane 608.

In FIG. 6C, view 600-C shows an interface by way of which various aspects of an onsite photo management server (e.g., onsite photo management server 100) may be configured. For example, a connection between the onsite photo management server and an offsite photo management server (e.g., such as offsite photo management server 220) may be configured using this interface. Additionally, synchronization status and messages may be viewed in this interface to facilitate setup, debug, and so forth.

Returning to FIG. 2, configuration 200 illustrates that onsite photo management server 100 and wireless network 204, which onsite photo management server 100 provides, may be connected to network 218 so as to allow onsite photo management server 100 to communicate with systems and devices external to event 202, such as offsite photo management server 220. Network 218 may provide data delivery infrastructure between onsite photo management server 100 and offsite photo management server 220 or other offsite devices and/or systems. Additionally, network 218 may provide data delivery infrastructure between onsite photo management server 100 and onsite devices such as mobile devices 216. For example, while dotted lines illustrate that mobile devices 216 may connect to network 218 by way of wireless network 204 in certain examples (e.g., examples where wireless network 204 is a WiFi network to which mobile devices 216 are connected), mobile devices 216 may also connect to network 218 directly in other examples (e.g., examples where network 218 includes a wireless carrier network such as a cellular carrier network to which mobile devices 216 are connected). Regardless, as shown, onsite photo management server 100 may be communicatively coupled with mobile devices 216 by way of network 218 rather than communicating with mobile devices 216 directly via wireless network 204.

To this end, network 218 may include a provider-specific wired or wireless communication network (e.g., a cable or satellite carrier network or a mobile telephone network), the Internet, a wide area network, a content delivery network, and/or any other suitable network or networks, and data may be distributed over network 218 using any suitable communication technologies implemented within network 218.

Offsite photo management server 220 may be implemented as a centralized photo management server that is permanently located at an offsite location (e.g., at a centralized location). Offsite photo management server 220 may perform certain similar operations as described above for onsite photo management server 100. For example, offsite photo management server 220 may serve as a data storage center where photographic content and other data (e.g., organizational metadata, favorites data, gallery characteristics, etc.) may be synchronized to be permanently stored in accordance with a predefined organizational structure and to be provided to users (e.g., via web applications, mobile applications, etc.) for browsing, viewing, downloading, printing, social media posting, and/or being otherwise managed as may serve a particular implementation. However, rather than being temporarily associated with a single event such as event 202, offsite photo management server 220 may be permanently associated with multiple events and/or clients including event 202 (e.g., maintaining an entirety of predefined organizational structure 300 described above in relation to FIG. 3, rather than maintaining just one event). For example, offsite photo management server 220 may communicate with a plurality of onsite photo management servers (e.g., including onsite photo management server 100), and/or may communicate with one onsite photo management server at different periods of time when the onsite photo management server is used at different events, so as to receive and permanently maintain photographic content associated with a plurality of different events (e.g., including event 202).

Offsite photo management server 220 may be implemented by any suitable servers, systems, devices, or the like as may serve a particular implementation to implement the web server and data center functionality described herein. For example, offsite photo management server 220 may include one or more application servers, image servers, web servers, database servers, synchronization servers, load balancers, DNS servers, and/or other systems or servers for performing the operations and functionality described herein. In some examples, multiple instances of the web application provided by offsite photo management server 220 may be run at once in order to scale for performance. In such examples, the multiple instances may be load balanced using an nginx proxy. Additionally, in order to maintain photographic content securely, offsite photo management server 220 may maintain a plurality (e.g., at least three in certain examples) of redundant databases to provide full replication of stored photographic content, as well as fault tolerance and increased performance.

Photographic content may be served by offsite photo management server 220 at any particular size and/or quality (e.g., pixel resolution, color resolution, etc.) as may be requested by a particular web client. For example, each photo stored on offsite photo management server 220 may be stored on multiple servers for replication and load balancing purposes, and may be provided at full resolution for a full download request, in a highly reduced resolution for a thumbnail request, or at some other reduced resolution as may be appropriate for other types of requests.

The web application provided by offsite photo management server 220 may be used by mobile devices such as mobile devices 216 and/or by other types of computers (e.g., laptop computers, desktop computers, etc.) during event 202. Additionally, the web application may be used to access and manage photographic content after event 202 has concluded. Regardless of whether event 202 is in the future, is ongoing, or has concluded, the web application provided by offsite photo management server 220 may be configured to perform various functions including serving as an entry point for all photographic content associated with the event 202 (e.g., uploaded by onsite photo management server 100, uploaded by mobile devices 216, etc.), serving as a central repository for all photographic content associated with event 202 and other events, and/or serving as a distribution node responsible for administering appropriate levels of access to the photographic content to different users.

Different levels of access may be provided to different types of users of the web application in any suitable manner. For example, certain users (e.g., people who maintain offsite photo management server 220 for multiple clients) may access the web server at a superuser administration level that allows them to manage clients (e.g., create, delete, and/or modify client accounts within the system) and have complete access to all events, galleries, favorites, and photos maintained within the system. Other users (e.g., clients, such as individual photographers or photography companies, who maintain an account within the system) may access the web server at a client administration level that allows them to manage their own events (e.g., creating, deleting, and/or modifying events, galleries, etc.), to create and manage branding of the website as it will be experienced by their clients (e.g., event attendees who will access photographic content from events the clients photograph), and to access all photographic content associated with their own events. Finally, still other users (e.g., event attendees who may be invited to access photographic content from one particular event) may access the web server at an event user interface level that allows the user to perform various tasks with respect to photographic content associated with one event (e.g., event 202) such as to view, download, upload, add to favorites, print, post to social media, and/or otherwise manage photographic content from the event in other ways described herein. For example, this level of access may be similar to the level of access provided to attendees 208 during event 202 by onsite photo management server 100 at photo kiosk devices 212.

Figure 7A:
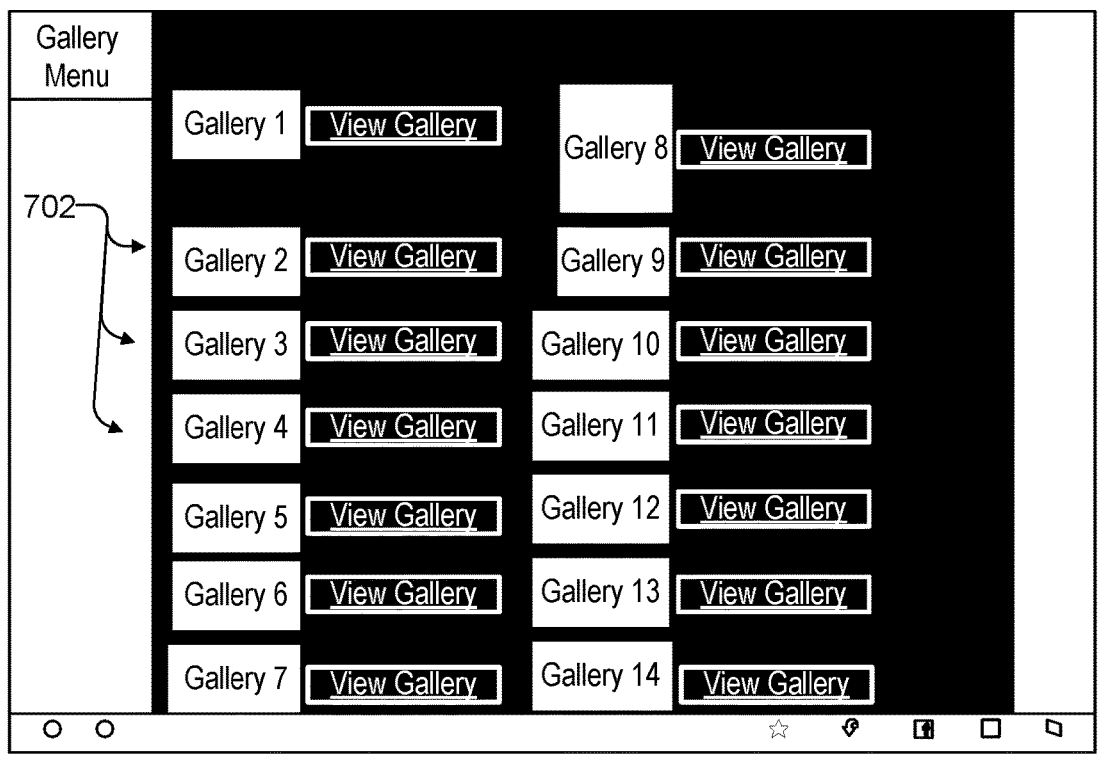
FIGS. 7A-7B illustrate exemplary user interface views that may be presented to users of a web application that provides access to photographic content captured at an event according to principles described herein.
Figure 7B:
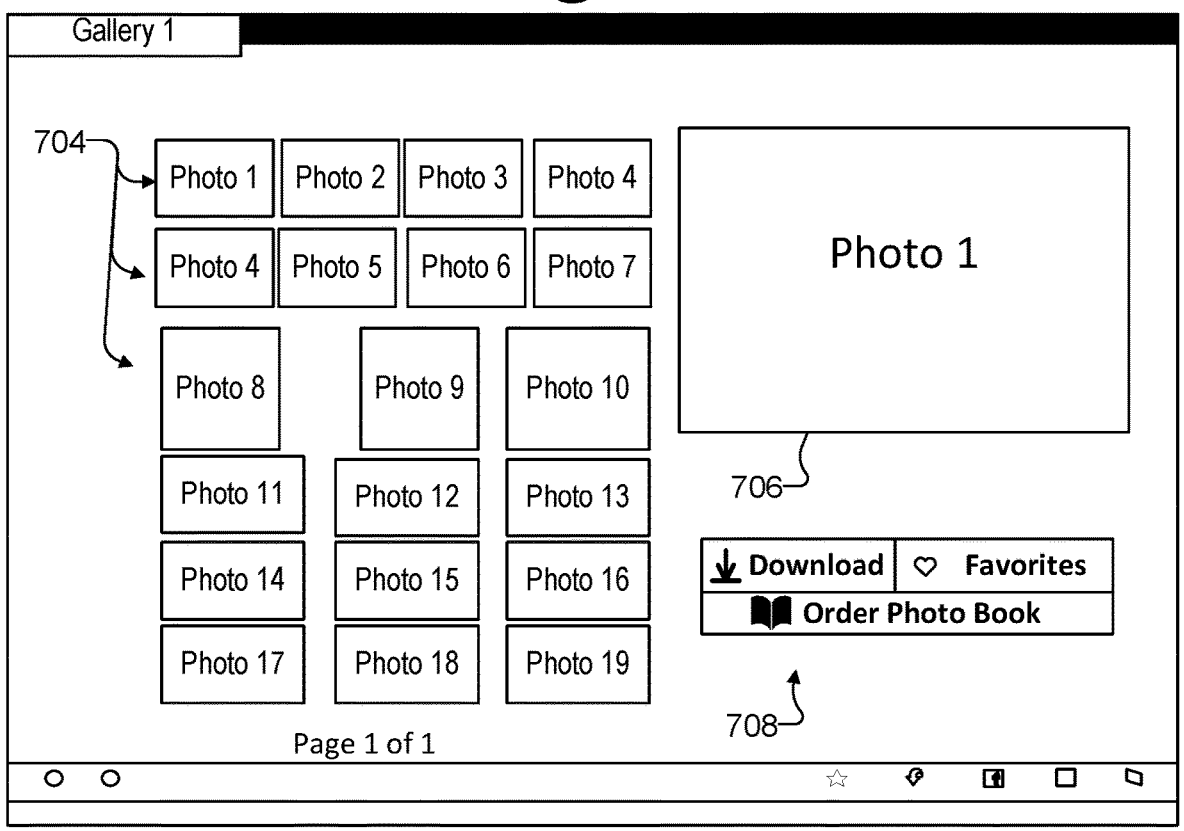

To illustrate how the web application may be presented by offsite photo management server 220, FIGS. 7A-7B show exemplary user interface views 700 (e.g., views 700-A and 700-B) that may be presented to users of a web application that provides access to photographic content captured at an event during and/or after the event.

Specifically, view 700-A of FIG. 7A illustrates how the web server may allow a user (e.g., a user having any of the levels of access) to browse and select a particular gallery. View 700-A is similar to view 500-C of FIG. 5C, which was described as being presented by onsite photo management server 100 at a photo kiosk device during the event. However, view 700-A may be accessed by way of a browser of a device at any time during or after the event. As shown, a plurality of galleries 702 are selectable by the user to browse and take action on similar to galleries 504 described above. As in FIG. 5C, each gallery 702 may be associated with a representative photo and/or a text link (e.g., "View Gallery") that may be selected (e.g., clicked, touched, etc.) to view the gallery 702 in more detail.

Once a particular gallery 702 is selected, view 700-B of FIG. 7B illustrates how the web server may allow the user to browse photographic content within the gallery. As such, view 700-B is similar to view 500-D of FIG. 5D, which was described as being presented by onsite photo management server 100 at a photo kiosk device during the event. However, like view 700-A, view 700-B may be configured to be accessed by way of a browser of a device at any time during or after the event. In view 700-B, a plurality of photos 704 are shown in thumbnail format, as well as a photo 706 upon which various actions 708 may be taken. For example, as with photo 506 described above, actions 708 that may be taken may include adding the photo to a favorites collection ("Favorites"), selecting the photo for publishing in a photo book to be sent to the user ("Order Photo Book"), posting the photo to social media (not explicitly shown), or the like. Additionally, because view 700-B may be used on a personal computer of the user, rather than at a shared kiosk terminal that the user likely does not own, other actions 708 such as downloading the photo ("Download") may also be available, as shown.

Figure 8A:
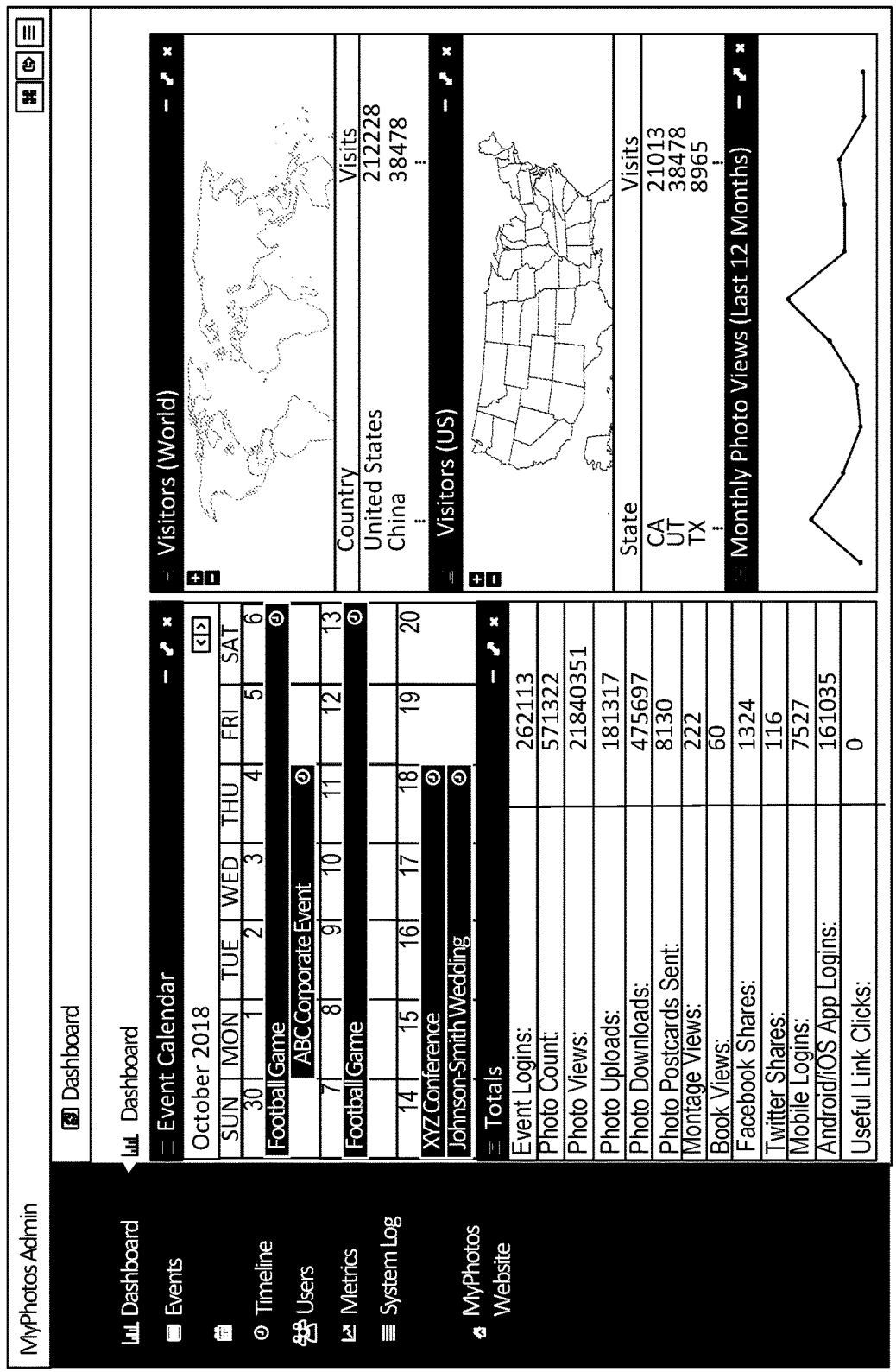

FIGS. 8A and 8B illustrate exemplary user interface views 800 (e.g., views 800-A and 800-B) that may be presented by the web application to users having a higher level of access such as the client administration level of access described above.

Specifically, view 800-A of FIG. 8A illustrates how events of a particular client may be managed in accordance with dates (e.g., based on a calendar of upcoming or past events) and/or locations (e.g., based on a map showing upcoming events or past events). As shown in view 800-A, a dashboard illustrating various statistics (e.g., event logins, photo count, photo views, photo uploads, photo downloads, etc.) may be presented to a user for past events to indicate how photos are being used since they were created. Additionally, maps and additional statistics may illustrate how such photo usage varies with geography either within a particular region or country (e.g., the United States) or globally.

Upcoming events may also be managed and set up using a web-based dashboard. For example, view 800-B of FIG. 8B illustrates a list view of past and/or upcoming events that may be managed such as by adding, removing, reorganizing, and/or modifying the events. Data such as a client name, an event code, an event password, and various statistics associated with a particular event may also be viewed, set, and/or otherwise managed using this interface.

While FIGS. 7A, 7B, 8A, and 8B illustrate various features and functionality that may be performed by offsite photo management server 220, it will be understood that these features are exemplary only and that various additional features and functionality may further be provided in certain implementations. For example, the web server provided by offsite photo management server 220 may allow users to view events by name, date, location, or description; may provide access to event specific external links; may provide access to a photo montage or slideshow; may allow users to browse photos by gallery to find photos to download, share via social media, upload, add to favorites, email photo postcards to friends, publish photo books, etc.; may allow users to take a survey associated with the event and the experiences of the users at the event; may allow users to input personal information defined by the client; may provide customized event branding such that the website accessed by users is event specific; may provide unlimited access for unlimited number of users and devices; may provide native mobile application event access; may provide photo search, tag, and/or renaming of photo files; may provide event management calendars; may provide photo archival; may provide multi-point simultaneous access to photographic content stored on the server; may provide direct sharing options for users to post photographic content to social media; may allow users to upload photographic content; may provide custom galleries for attendees (e.g., favorites galleries); may provide password protection for greater security; may track and provide access to photo interaction metrics (e.g., how many views each photo has received, etc.); may provide single and multiple photo download options; may provide direct event links for easy access to photographic content for event attendees; may allow event attendees to text an image or link to a cell phone directly from the web server; may provide customizable layouts or themes on individual pages or for individual events; may provide a photo montage creator or slideshow creator with customizable transitions, music, etc., and that automatically selects a certain number of photos from certain galleries; may provide an automatic photo book creator (e.g., a one-click photo book creator); may allow the photographer to only designate certain photos to be stored to thereby help the photographer maintain a certain level of quality in his or her published work; may provide live metrics representative of what users are engaging with in real time at the event; and/or may provide any other suitable features or functionality as may serve a particular implementation.

Returning to FIG. 2, mobile devices 216 may be implemented by any suitable mobile devices that may be used during event 202 or after the conclusion of event 202. For example, mobile devices 216 may be implemented by smartphones, tablet computers, or the like, that are running mobile operating systems and that may access a web-based application provided by the web server of offsite photo management server 220 (described above) using a mobile browser or native mobile application. In other examples, mobile devices 216 may be implemented by laptop computers or other devices that are running full operating systems and access the web-based application using full, non-mobile browsers. Mobile devices 216 may facilitate their users (e.g., attendees 208-3 and 280-5 in the example of FIG. 2) in accessing photographic content from onsite photo management server 100 and/or from offsite photo management server 220 in any of the ways and using any of the features or functionality described herein.

As described above, mobile devices 216 may use wireless network 204, which may be generated and provided by onsite photo management server 100, to access network 218 (e.g., to access the Internet by using onsite photo management server 100 as a proxy) and to thereby access onsite photo management server 220. Additionally, in certain examples, mobiles devices 216 may use wireless network 204 to directly access photo kiosk devices 212 or photo printing devices 214. For example, event attendees may wish to use the kiosks present at event 202 to view, browse, and/or print personal photographic content (e.g., photographic content stored on mobile devices 216 that was captured prior to event 202 and/or that may not be associated with event 202). If the system has been configured to allow event attendees to do this, a mobile device 216 may thus communicate with a photo kiosk device 212 and/or a photo printing device 214 (e.g., via wireless network 204) to allow an event attendee to browse and view personal photos using the photo kiosk device 212 and/or to allow the event attendee to print the personal photographic content using the photo printing device 214.

Mobile devices 216 may run native mobile applications (e.g., for Android, iOS, etc.) that use API calls to access the primary web application provided by offsite photo management server 220 described above. As such, the mobile applications may provide any of the functionality described above. To illustrate, FIGS. 9A through 9D show exemplary user interface views 900 (e.g., views 900-A through 900-D) that may be presented to users of the mobile application (e.g., to event attendees 208).

Figure 9A:
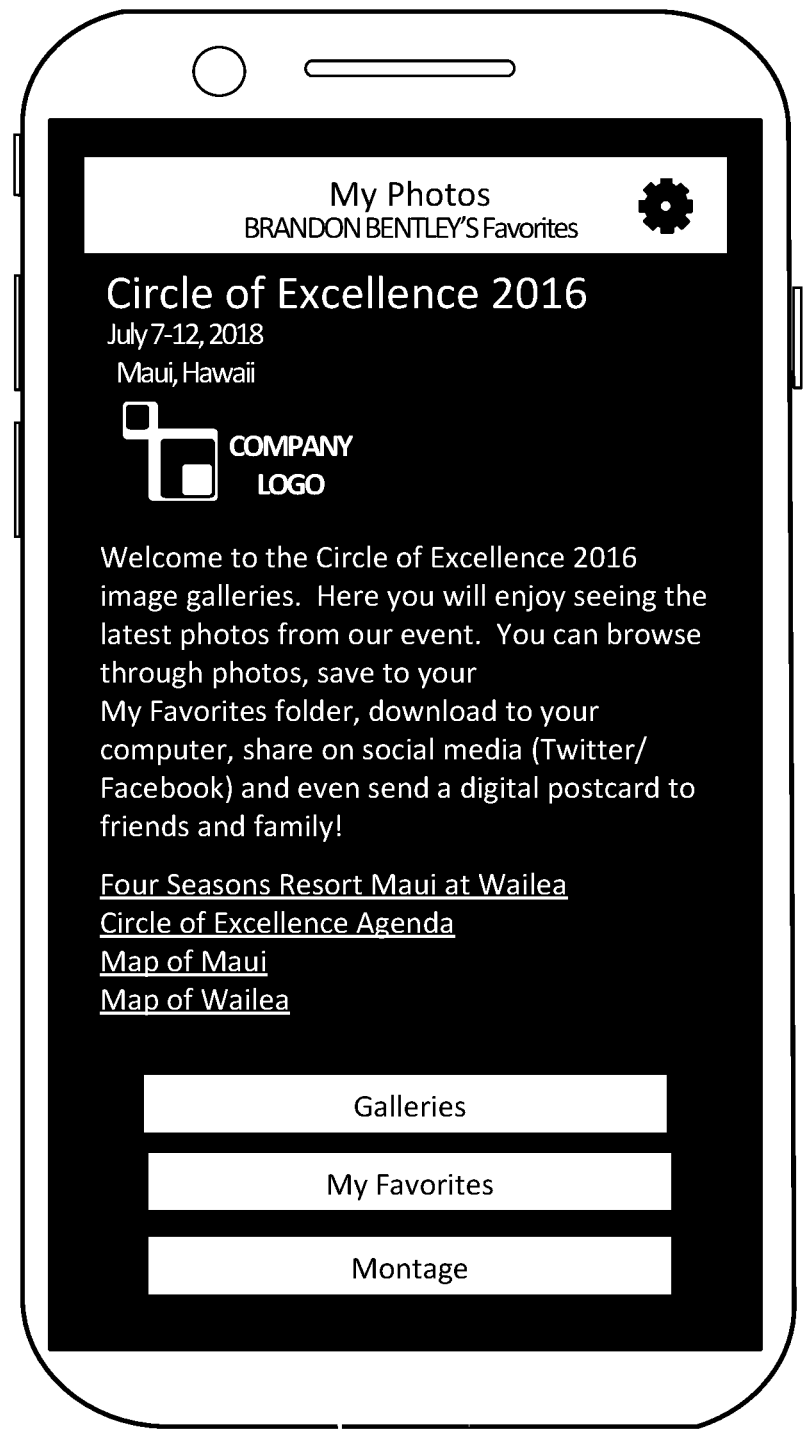
FIGS. 9A-9D illustrate exemplary user interface views that may be presented to users of a mobile application that provides access to photographic content captured at an event according to principles described herein.

Specifically, view 900-A of FIG. 9A illustrates a branded site for a particular event that includes a description of the event and links to browse galleries associated with the event, to browse a favorites collection of the user, and/or to create or view a montage of photographic content associated with the event.

Figure 9B:
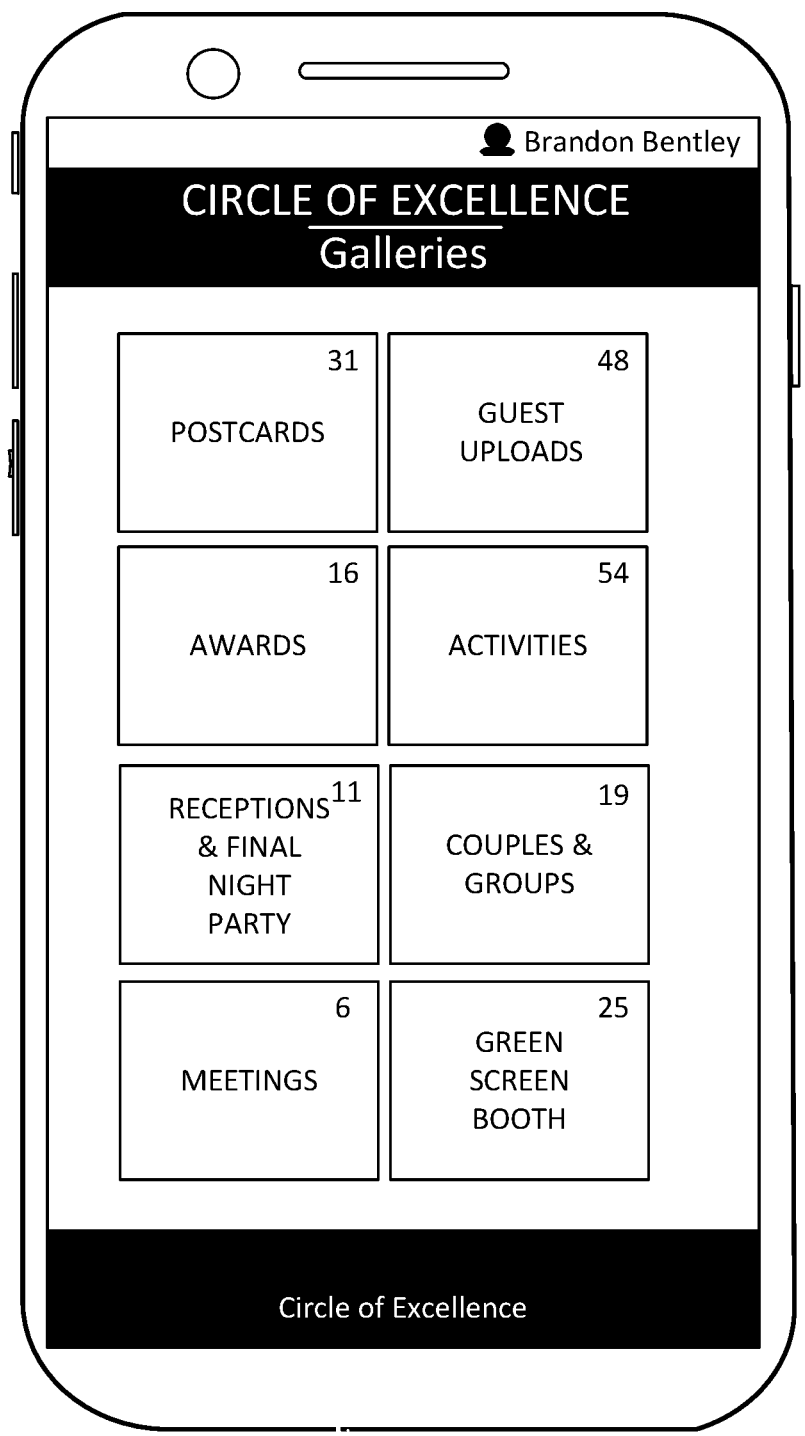

View 900-B of FIG. 9B illustrates how the mobile application may allow a user to browse and select a particular gallery. View 900-B is thus similar to views 500-C of FIG. 5C and 700-A of FIG. 7A in this way, which were described above as being presented on a photo kiosk device and on a web browser, respectively.

Figure 9C:
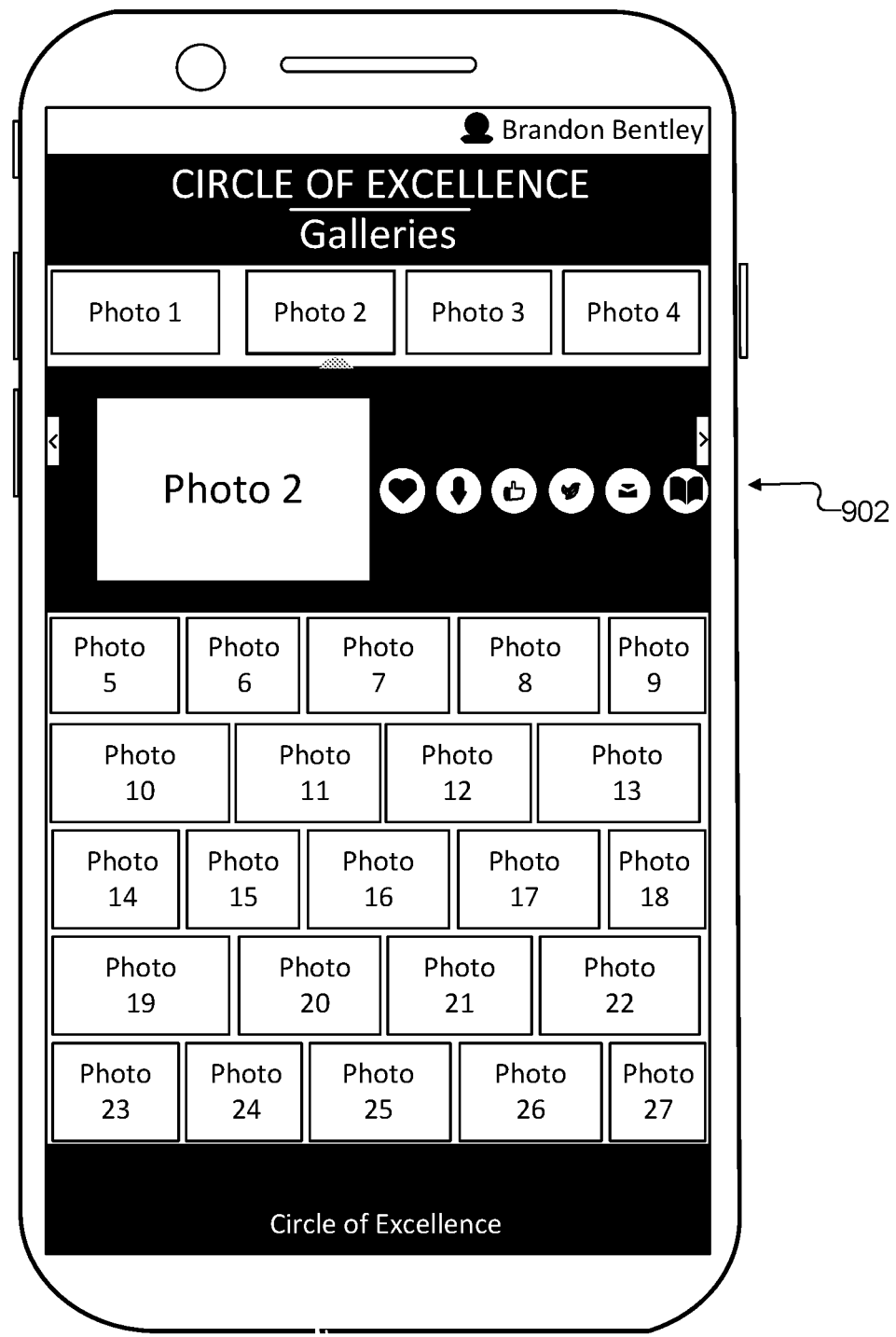

View 900-C of FIG. 9C illustrates how the mobile application may allow the user to browse photographic content within a gallery and to select a particular photo ("Photo 2") upon which to perform various actions 902 such as downloading, post to social media, adding to favorites, emailing, publishing a photo book, or the like. View 900-C is thus similar to views 500-D of FIG. 5D and 700-B of FIG. 7B in this way, which were described above as being presented on a photo kiosk device and on a web browser, respectively.

Figure 9D:
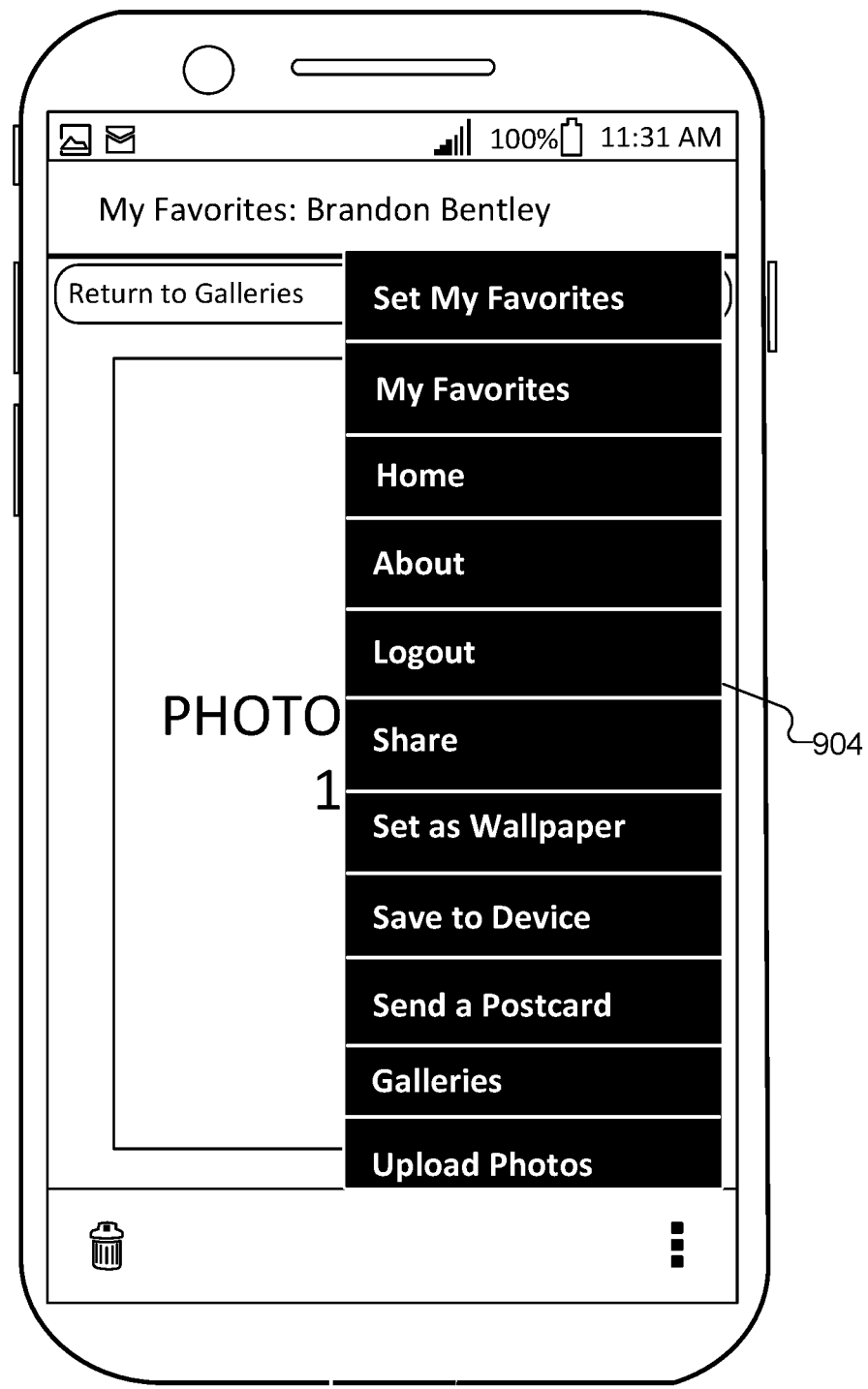

View 900-D of FIG. 9D illustrates various options that may be available on a menu 904 from an interface such as shown in view 900-C (e.g., when a particular photo is selected, etc.). Specifically, as shown, menu 904 may be used to set a selected photo ("PHOTO 1") to represent a favorites collection ("Set My Favorites"), to add a selected photo to a favorites collection ("Favorites"), to return to a home screen ("Home"), to view metadata associated with a selected photo ("About"), to logout ("Logout"), to share a selected photo ("Share"), to set a selected photo as wallpaper for the mobile device ("Set as Wallpaper"), to download a selected photo ("Save to Device"), to send an email postcard featuring a selected photo ("Send a Postcard"), to return to viewing the gallery from which a photo was selected ("Galleries"), to upload attendee-captured photographic content to either the onsite photo management server or the offsite photo management server ("Upload Photos"), or any other functionality as may serve a particular implementation.

Figure 10:
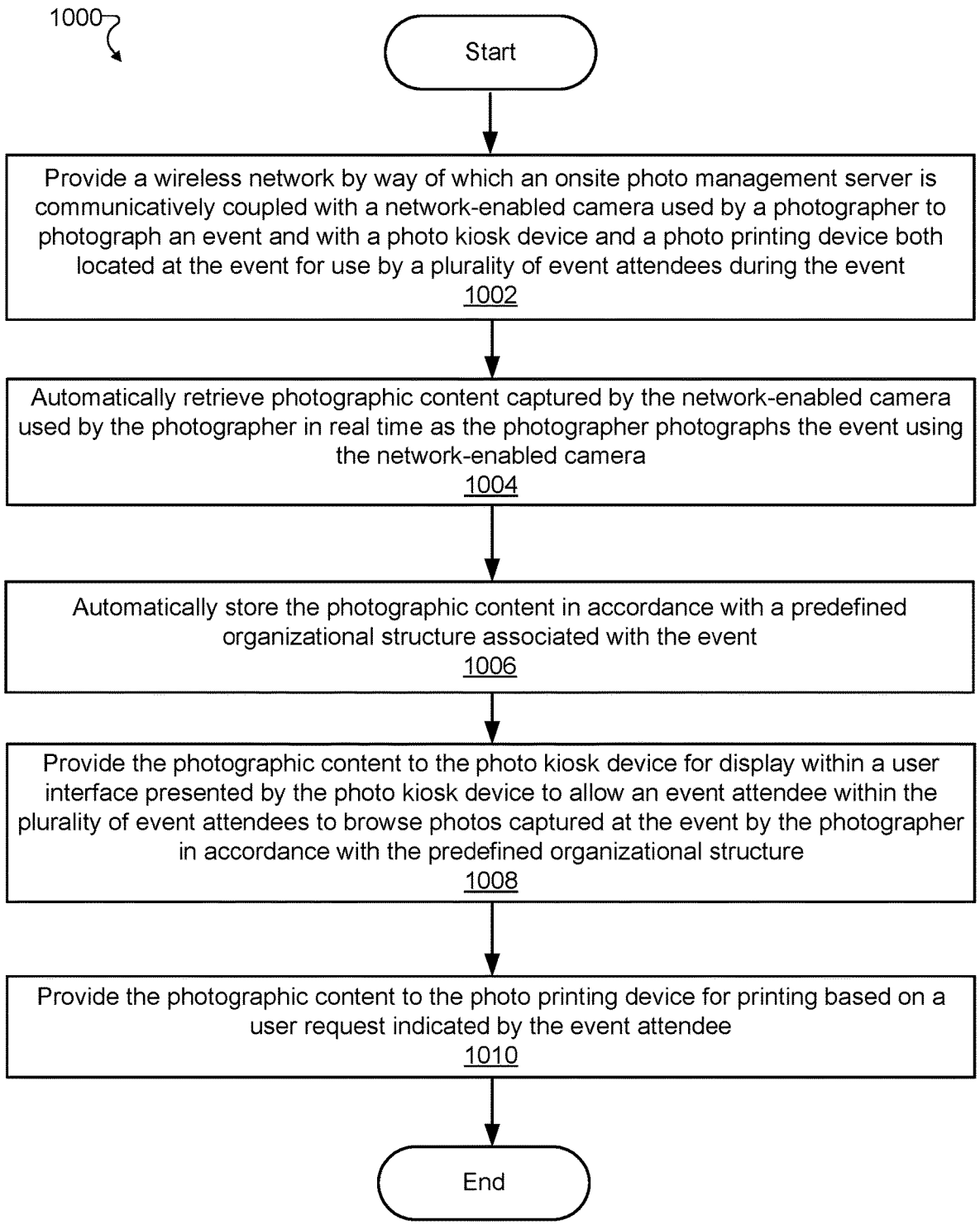
FIG. 10 illustrates an exemplary event-based method for managing photographic content according to principles described herein.

FIG. 10 illustrates an exemplary event-based method 1000 for managing photographic content. While FIG. 10 illustrates exemplary operations according to one embodiment, other embodiments may omit, add to, reorder, and/or modify any of the operations shown in FIG. 10. One or more of the operations shown in FIG. 10 may be performed by an onsite photo management server such as onsite photo management server 100, any components included therein, and/or any implementation thereof (e.g., including by an event-based system for managing photographic content that includes an implementation of onsite photo management server 100 such as event-based system 400 or the system illustrated by configuration 200 in FIG. 2).

In operation 1002, an onsite photo management server may provide a wireless network by way of which the onsite photo management server is communicatively coupled with various components associated with an event being photographed by a photographer and being attended by a plurality of event attendees. For example, by way of the wireless network, the onsite photo management server may be communicatively coupled with a network-enabled camera used by the photographer to photograph the event, with a photo kiosk device located at the event for use by the plurality of event attendees during the event, and with a photo printing device also located at the event for use by the plurality of event attendees during the event. Operation 1002 may be performed in any of the ways described herein.

In operation 1004, the onsite photo management server may automatically retrieve photographic content captured by the network-enabled camera used by the photographer. For example, the onsite photo management server may automatically retrieve the photographic content by way of the wireless network provided in operation 1002. In some implementations, the automatic retrieving of the photographic content may be performed in real time as the photographer photographs the event using the network-enabled camera. Operation 1004 may be performed in any of the ways described herein.

In operation 1006, the onsite photo management server may automatically store the photographic content in accordance with a predefined organizational structure associated with the event. For example, the onsite photo management server may automatically store the photographic content in response to the automatic retrieval of the photographic content by operation 1004 described above. Operation 1006 may be performed in any of the ways described herein.

In operation 1008, the onsite photo management server may provide the photographic content to the photo kiosk device. For example, the photographic content may be provided to the photo kiosk device for display within a user interface presented by the photo kiosk device to thereby allow an event attendee within the plurality of event attendees to browse photos captured at the event by the photographer. In some examples, the event attendee may browse the photos captured in accordance with the predefined organizational structure. Operation 1008 may be performed in any of the ways described herein.

In operation 1010, the onsite photo management server may provide the photographic content to the photo printing device for printing. For example, the onsite photo management server may provide the photographic content to the photo printing device based on a user request indicated by the event attendee. Operation 1010 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 11:
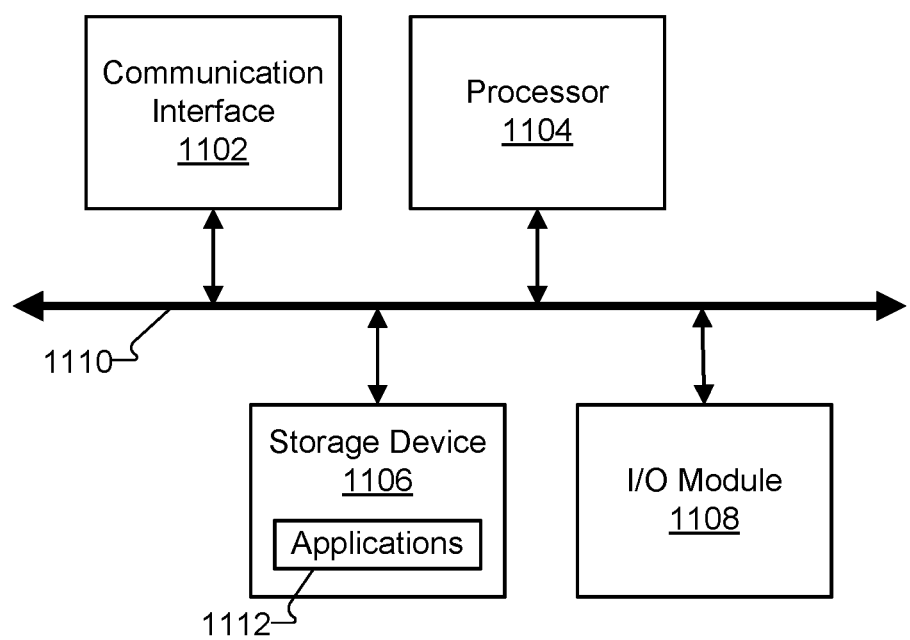
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual reality experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with facilities 102 or 104 of onsite photo management server 100. Likewise, storage facility 106 of onsite photo management server 100 may be implemented by storage device 1106 or a component thereof.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

maintaining, by an offsite photo management server remote from an event being photographed by a photographer and being attended by a plurality of event attendees, an entirety of a predefined organizational structure in which photographic content captured during the event is stored for a client, the entirety of the predefined organizational structure including:

a client layer within which is organized a plurality of clients including the client, an event layer within which is organized one or more events for each client of the plurality of clients, and a gallery layer within which is organized one or more galleries for each event in the event layer;

maintaining, by an onsite photo management server located at the event, a portion of the predefined organizational structure relating to the event and including only photographic content associated with the gallery layer for the event and the client and not including photographic content for other clients or events of the client layer or event layer;

providing, by the onsite photo management server, a local wireless network by way of which the onsite photo management server is communicatively coupled with a network-enabled camera used by the photographer;

automatically retrieving, by the onsite photo management server and by way of the local wireless network provided by the onsite photo management server, photographer-captured photographic content that is captured during the event by the photographer using the network-enabled camera;

receiving, by the offsite photo management server and by way of an external network distinct from the local wireless network, attendee-captured photographic content that is captured during the event by the plurality of event attendees using mobile devices;

synchronizing, by the onsite photo management server and by way of the external network, the photographer-captured photographic content to the offsite photo management server to be stored in accordance with the entirety of the predefined organizational structure maintained by the offsite photo management server;

synchronizing, by the offsite photo management server and by way of the external network, the attendee-captured photographic content to the onsite photo management server to be stored in accordance with the portion of the predefined organizational structure maintained by the onsite photo management server; and providing, by the onsite photo management server, the photographer-captured photographic content and the attendee-captured photographic content for display within a user interface to allow an event attendee within the plurality of event attendees to browse photos captured at the event by the photographer and the plurality of event attendees in accordance with the predefined organizational structure.

2. The method of claim 1, wherein:

the onsite photo management server is further communicatively coupled, by way of the local wireless network, with the mobile devices used by the plurality of event attendees;

the onsite photo management server is configured as a web proxy server for providing access, for the mobile devices used by the plurality of event attendees, to the external network;

using the web proxy server and by way of the external network, the mobile devices used by the plurality of event attendees provide the attendee-captured photographic content to the offsite photo management server; and the automatic retrieving of the attendee-captured photographic content includes automatically retrieving the attendee-captured photographic content from the offsite photo management server in real time as the mobile devices used by the plurality of event attendees provide the attendee-captured photographic content.

3. The method of claim 1, wherein:

the user interface for displaying the photographer-captured photographic content and the attendee-captured photographic content is a user interface of a photo kiosk device at the event, the photo kiosk device configured for use by any of the plurality of event attendees; and the method further comprises providing the photographer-captured photographic content and the attendee-captured photographic content to the mobile devices used by the plurality of event attendees to allow the event attendee to further browse the photos captured at the event by the photographer and the plurality of event attendees in accordance with the predefined organizational structure.

4. The method of claim 3, wherein:

the photo kiosk device is communicatively coupled to a photo printing device configured to print photos browsed and selected for printing using the photo kiosk device.

5. The method of claim 1, wherein:

the synchronizing of the photographer-captured photographic content is performed in real time during the event as the photographer-captured photographic content is automatically retrieved from the network-enabled camera; and the synchronizing of the attendee-captured photographic content is performed in real time during the event as the attendee-captured photographic content is provided from the mobile devices to the offsite photo management server.

6. The method of claim 1, wherein:

the onsite photo management server is further communicatively coupled with an event administration controller configured to provide an additional user interface to facilitate an administrator at the event in managing the onsite photo management server; and the onsite photo management server performs, in accordance with the managing of the onsite photo management server by the administrator using the user interface provided by the event administration controller, at least one of:
the providing of the local wireless network,
the automatic retrieving of the photographer-captured photographic content,
the synchronizing of the photographer-captured photographic content to the offsite photo management server, or
the providing of the photographer-captured photographic content and the attendee-captured photographic content for display within the user interface.

7. The method of claim 1, wherein:
the plurality of galleries for the event includes one or more galleries each associated with particular characteristics that are predefined prior to commencement of the event in anticipation that the particular characteristics will characterize at least a subset of photographic instances included in a plurality of photographic instances making up the photographer-captured photographic content; and
the predefined organizational structure further includes a favorites layer within which is organized a plurality of favorites collections each associated with a different respective event attendee in the plurality of event attendees and linked to one or more photographic instances designated by the respective event attendee during the event from the plurality of photographic instances making up the photographer-captured photographic content.

8. The method of claim 1, further comprising providing, by the onsite photo management server in response to user input to the onsite photo management server from the event attendee, a subset of photographic instances included in a plurality of photographic instances making up the photographer-captured photographic content and the attendee-captured photographic content to a photo book publisher for publishing a photo book including the subset of the photographic instances, the subset of the photographic instances selected during the event by the event attendee using a photo kiosk device that presents the user interface.

9. An onsite photo management server comprising:
a network interface configured to:
provide, for an event at which the onsite photo management server is located and which is being photographed by a photographer and attended by a plurality of event attendees, a local wireless network by way of which the onsite photo management server is communicatively coupled with a network-enabled camera used by the photographer to photograph the event, and
communicate with an offsite photo management server that is remote from the event and that maintains an entirety of a predefined organizational structure in which photographic content captured during the event is stored for a client, the entirety of the predefined organizational structure including:
a client layer within which is organized a plurality of clients including the client,
an event layer within which is organized one or more events for each client of the plurality of clients, and
a gallery layer within which is organized one or more galleries for each event in the event layer;
a memory storing instructions and maintaining a portion of the predefined organizational structure relating to the event and including only photographic content associated with the gallery layer for the event and the client and not including photographic content for other clients or events of the client layer or event layer; and
a processor communicatively coupled with network interface and the memory and configured to execute the instructions to:
automatically retrieve, by way of the local wireless network provided by the network interface, photographer-captured photographic content that is captured during the event by the photographer using the network-enabled camera,
synchronize, by way of an external network distinct from the local wireless network, the photographer-captured photographic content to the offsite photo management server to be stored in accordance with the entirety of the predefined organizational structure maintained by the offsite photo management server,
synchronize, by way of the external network, attendee-captured photographic content from the offsite photo management server to be stored in accordance with the portion of the predefined organizational structure maintained in the memory, the attendee-captured photographic content captured and provided to the offsite photo management server during the event by the plurality of event attendees using mobile device, and
provide the photographer-captured photographic content and the attendee-captured photographic content for display within a user interface to allow an event attendee within the plurality of event attendees to browse photos captured at the event by the photographer and the plurality of event attendees in accordance with the predefined organizational structure.

10. The onsite photo management server of claim 9, wherein:
the plurality of galleries for the event includes one or more galleries each associated with particular characteristics that are predefined prior to commencement of the event in anticipation that the particular characteristics will characterize at least a subset of photographic instances included in a plurality of photographic instances making up the photographer-captured photographic content; and
the predefined organizational structure further includes a favorites layer within which is organized a plurality of favorites collections each associated with a different respective event attendee in the plurality of event attendees and linked to one or more photographic instances designated by the respective event attendee during the event from the plurality of photographic instances making up the photographer-captured photographic content.

11. The onsite photo management server of claim 9, further comprising an industrial housing within which the onsite photo management server is implemented, the industrial housing configured to house the onsite photo management server and to not house a built-in keyboard.

12. A system comprising:
a network-enabled camera used by a photographer to photograph an event at which the system is located and which is being attended by a plurality of event attendees;

an offsite photo management server remote from the event and that:
  maintains an entirety of a predefined organizational structure in which photographic content captured during the event is stored for a client, the entirety of the predefined organizational structure including:
    a client layer within which is organized a plurality of clients including the client,
    an event layer within which is organized one or more events for each client of the plurality of clients, and
    a gallery layer within which is organized one or more galleries for each event in the event layer, and
  receives, by way of an external network, attendee-captured photographic content that is captured during the event by the plurality of event attendees using mobile devices; and
an onsite photo management server that:
  maintains a portion of the predefined organizational structure relating to the event and including only photographic content associated with the gallery layer for the event and the client and not including photographic content for other clients or events of the client layer;
  provides a local wireless network distinct from the external network and by way of which the onsite photo management server is communicatively coupled with the network-enabled camera used by the photographer,
  automatically retrieves, by way of the local wireless network provided by the onsite photo management server, photographer-captured photographic content that is captured during the event by the photographer using the network-enabled camera,
  synchronizes, by way of the external network, the photographer-captured photographic content to the offsite photo management server to be stored in accordance with the entirety of the predefined organizational structure maintained by the offsite photo management server,
  synchronizes, by way of the external network, the attendee-captured photographic content from the offsite photo management server to be stored in accordance with the portion of the predefined organizational structure maintained by the onsite photo management server, and
  provides the photographer-captured photographic content and the attendee-captured photographic content for display within a user interface to allow an event attendee within the plurality of event attendees to browse photos captured at the event by the photographer and the plurality of event attendees in accordance with the predefined organizational structure.

13. The system of claim 12, wherein:
the onsite photo management server is further communicatively coupled, by way of the local wireless network, with the mobile devices used by the plurality of event attendees;
the onsite photo management server is configured as a web proxy server for providing access, for the mobile devices used by the plurality of event attendees, to the external network;
using the web proxy server and by way of the external network, the mobile devices used by the plurality of event attendees provide the attendee-captured photographic content to the offsite photo management server; and
the automatic retrieving of the attendee-captured photographic content includes automatically retrieving the attendee-captured photographic content from the offsite photo management server in real time as the mobile devices used by the plurality of event attendees provide the attendee-captured photographic content.

14. The system of claim 12, wherein:
the user interface for displaying the photographer-captured photographic content and the attendee-captured photographic content is a user interface of a photo kiosk device at the event, the photo kiosk device configured for use by any of the plurality of event attendees; and
the onsite photo management server further provides the photographer-captured photographic content and the attendee-captured photographic content to the mobile devices used by the plurality of event attendees to allow the event attendee to further browse the photos captured at the event by the photographer and the plurality of event attendees in accordance with the predefined organizational structure.

15. The system of claim 14, wherein:
the photo kiosk device is communicatively coupled to a photo printing device configured to print photos browsed and selected for printing using the photo kiosk device.

16. The system of claim 12, wherein:
the onsite photo management server performs the synchronizing of the photographer-captured photographic content in real time during the event as the photographer-captured photographic content is automatically retrieved from the network-enabled camera; and
the onsite photo management server performs the synchronizing of the attendee-captured photographic content in real time during the event as the attendee-captured photographic content is provided from the mobile devices to the offsite photo management server.

17. The system of claim 12, further comprising:
an event administration controller communicatively coupled with the onsite photo management server and configured to provide an additional user interface to facilitate an administrator at the event in managing the onsite photo management server;
wherein the onsite photo management server performs, in accordance with the managing of the onsite photo management server by the administrator using the user interface provided by the event administration controller, at least one of:
  the providing of the local wireless network,
  the automatic retrieving of the photographer-captured photographic content,
  the synchronizing of the photographer-captured photographic content to the offsite photo management server, or
  the providing of the photographer-captured photographic content and the attendee-captured photographic content for display within the user interface.

18. The system of claim 12, wherein:
the plurality of galleries for the event includes one or more galleries each associated with particular characteristics that are predefined prior to commencement of the event in anticipation that the particular characteristics will characterize at least a subset of photographic instances included in a plurality of photographic instances making up the photographer-captured photographic content; and the predefined organizational structure further includes a favorites layer within which is organized a plurality of favorites collections each associated with a different respective event attendee in the plurality of event attendees and linked to one or more photographic instances designated by the respective event attendee during the event from the plurality of photographic instances making up the photographer-captured photographic content.

19. The system of claim 12, wherein the onsite photo management server further provides, in response to user input to the onsite photo management server from the event attendee, a subset of photographic instances included in a plurality of photographic instances making up the photographer-captured photographic content and the attendee-captured photographic content to a photo book publisher for publishing a photo book including the subset of the photographic instances, the subset of the photographic instances selected during the event by the event attendee using a photo kiosk device that presents the user interface.

20. The system of claim 12, further comprising an industrial housing within which the onsite photo management server is implemented, the industrial housing configured to house the onsite photo management server and to not house a built-in keyboard.

\* \* \* \* \*